(12) United States Patent
Mazzaferri et al.

(10) Patent No.: US 8,789,144 B2
(45) Date of Patent: Jul. 22, 2014

(54) MEDIATING RESOURCE ACCESS BASED ON A PHYSICAL LOCATION OF A MOBILE DEVICE

(75) Inventors: Richard Mazzaferri, Mooney Mooney (AU); Martin Duursma, West Pennant Hills (AU); Donovan Hackett, Marsfield (AU); Lee Laborczfalvi, Wollstonecraft (AU)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 13/267,031

(22) Filed: Oct. 6, 2011

(65) Prior Publication Data

US 2012/0102549 A1    Apr. 26, 2012

Related U.S. Application Data

(60) Provisional application No. 61/390,345, filed on Oct. 6, 2010.

(51) Int. Cl.
*H04L 29/02* (2006.01)

(52) U.S. Cl.
USPC .................................................. 726/4; 726/27

(58) Field of Classification Search
None
See application file for complete search history.

(56) References Cited

U.S. PATENT DOCUMENTS

| | | | |
|---|---|---|---|
| 6,370,629 B1* | 4/2002 | Hastings et al. | 711/163 |
| 7,912,787 B2* | 3/2011 | Sakakihara et al. | 705/59 |
| 8,613,108 B1* | 12/2013 | Aggarwal | 726/29 |
| 2002/0017977 A1 | 2/2002 | Wall | |
| 2002/0164999 A1 | 11/2002 | Johnson | |
| 2007/0101438 A1* | 5/2007 | Govindarajan | 726/27 |
| 2008/0022003 A1* | 1/2008 | Alve | 709/229 |
| 2008/0307498 A1 | 12/2008 | Johnson et al. | |
| 2009/0327501 A1 | 12/2009 | Athsani et al. | |

OTHER PUBLICATIONS

Borders et al., "CPLO: High-Performance Policy Evaluation", ACM, 2005.*
Bertolissi et al., "Time and Location Based Services with Access Control", ESR Groups France, 2008.*
Nebulas Solutions Group, "Nebulas Solutions Launches 'VDI in a Box' to Cut the Coast, Time and Complexity of Deploying Virtual Desktop Infrastructures", dated Aug. 4, 2009.
International Application No. PCT/US11/55062—International Search Report dated Feb. 27, 2012.

* cited by examiner

*Primary Examiner* — Minh Dinh
(74) *Attorney, Agent, or Firm* — Banner & Witcoff, Ltd.

(57) ABSTRACT

One or more techniques are provided for causing a location of a screen image associated with a resource to be adjusted on a display device. The adjustment may be based at least in part on determining that a control element receives focus. The resource may be associated with an application, such as an email application that may be hosted remotely from a client device. Access to one or more resources may be controlled or mediated. Access rights may be based at least in part on a determination of a geographic location of a client device. When the client device is located in a safe area, the client device may be provided access to the resource. When the client device is not located in a safe area, the client device might not be provided access to the resource or might not be provided full access to the resource.

18 Claims, 18 Drawing Sheets

MEDIATING RESOURCE ACCESS BASED ON A PHYSICAL LOCATION OF A MOBILE DEVICE

CROSS REFERENCE TO RELATED APPLICATIONS

This application is a non provisional of and claims priority to co-pending U.S. provisional application Ser. No. 61/390,345, filed Oct. 6, 2010, entitled "MEDIATING RESOURCE ACCESS BASED ON A PHYSICAL LOCATION OF A MOBILE DEVICE." The above identified application is incorporated herein by reference in its entirety.

FIELD OF THE DISCLOSURE

This disclosure generally relates to displaying remotely executing applications on client devices. In particular, this disclosure relates to granting access to resources based on the physical location of a client device.

BACKGROUND OF THE DISCLOSURE

The proliferation of mobile devices equipped to execute remote applications and access remote resources from any location and over any network greatly increases the need to control whether to send remote content to a mobile device. Using a mobile device to display remotely executing applications that can potentially access and display sensitive information can pose a security risk. One way to mitigate this risk can include only providing the mobile device with access to those resources deemed safe for viewing in a public location. Determining whether a mobile device is located within a public location can include determining what type of network the mobile device uses to access the remote application and remote resources.

Restricting application and resource access in this way can pose problems when a user accesses a resource or application using a secure network but in an unsecure physical location. For example, the status of a network as secure might not be indicative of the actual or underlying conditions, such that in reality access rights should not be provided or granted to a particular client device.

SUMMARY OF THE DISCLOSURE

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to methods, apparatuses, computer-readable media, and systems for mediating access to one or more resources.

Aspects of the disclosure are directed to mitigating security problems associated with displaying sensitive information on a device, such as a mobile device, when that device is physically located in an unsecure location.

Aspects of the disclosure are directed to mediating access to applications and resources based on a device's (e.g., a mobile device's) physical location. In some embodiments, information associated with a device's, e.g., a client device's, current location may be received. One or more other devices, such as one or more servers, may determine whether the client device is located in an area that is predetermined to be a safe area. Responsive to determining that the information indicates that the client device is located in an area that is predetermined to be a safe area, the server may cause the client device to be provided with access to content, such as remote content comprising remote application output. In some embodiments, the server may host the remote content. In some embodiments, the output may comprise draw commands and images generated by a remote application. In some embodiments, the remote content may comprise one or more remote files.

In some embodiments, a determination may be made that a client device has changed location. For example, a determination may be made that the client device has moved from a safe area to an area that is either an unsafe area or not a safe area. Responsive to determining that the client device has moved from a safe area to an area that is either an unsafe area or not a safe area, access to a resource may be partially or completely restricted. In some embodiments, access to a resource may be based at least in part on one or more conditions, such as a determined location of a client device.

Aspects of the disclosure are directed to causing one or more applications to be displayed on a device, such as a mobile device. The applications may receive input from a touch screen. The applications may be displayed within the context of an operating system configured to receive input via a touch screen. In some embodiments, one or more applications may be remotely-generated.

In some embodiments, a focus event may be intercepted or a notification of a focus event may be received and sent to a device, such as a mobile computing device. The focus event may be associated with a remote application executing on a remote computer. The event notification may be transmitted from the remote computer to the device. In some embodiments, the remote application executing on the remote computer may be displayed on the device. Upon receiving the event notification, the device may alter the display of the remote application.

In some instances, when a particular control or edit field within a remote application receives focus, a virtual keyboard may be displayed, e.g., on a display of a device, such as a mobile device. When that control or edit field loses focus, the virtual keyboard might be hidden. In some embodiments, when a virtual keyboard is displayed in response to a control or edit field receiving focus, the application may be panned (e.g., scrolled upwards or downwards) to prevent the virtual keyboard from covering the control or edit field.

In some embodiments, a zoom level associated with a section of an application may be adjusted. The zoom level may be adjusted responsive to determining that a control or edit field in that section of the application has focus. The zoom level adjustment may include zooming in or zooming out. The control may comprise one or more of a list box, a combo box, or other similar control. Zooming in on the section of the application housing the control may be accomplished using a native zoom function provided by an operating system executing on the device, or a custom zooming function provided by a client executing on the device, e.g. CITRIX RECEIVER/ICA CLIENT. In some embodiments, the methods and systems described herein may permit using a local slider function in lieu of a slider control that may be provided within the application.

When a user is displaying a remote application, or desktop, the user may intelligently zoom or pan on the title bar, scroll bar, window edges or other features of a window associated with the remote application. Thus, rather than trying to manually scale these features, the user may interact with the remote application in substantially the same way that the user would interact with an application modified to execute on the device and receive primarily touch screen input. For example, upon a user placing focus on a section of the remote application for a predetermined period of time (e.g. 0.3 seconds), the system may take advantage of local auto-zoom controls to auto-zoom to the section of the remote application that received focus. Auto-zooming may include a verification of the coordinates of the section of the remote application and then zooming to that section. In some embodiments, zooming may include showing a zooming bubble on the device when a user touches a control within the remote application.

Aspects of the disclosure are directed to providing a native user experience for users accessing remote applications through an application executing on a device, such as a mobile device. The application executing on the device, in some embodiments, may include CITRIX RECEIVER published by CITRIX SYSTEMS. In other embodiments, the device may include an IPHONE or IPAD.

Aspects of the disclosure are directed to mitigating display problems created by trying to display a remote application on a device, such as a mobile device. In some embodiments, one or more existing and/or displayed applications may be altered to facilitate the display of the remote application so that those facilitating applications properly display the remote application. For example, FIG. 11 illustrates an example of a properly displayed remote application where the text control of focus 1108 may be scrolled up, located, and/or sized automatically so that the a virtual keyboard 1114 does not overlap the text control and so that a user can view data as it is inputted into the text control 1108 using the keyboard 1114. In FIG. 11, the keyboard may automatically pop up or launch instead of being manually launched.

BRIEF DESCRIPTION OF THE DRAWINGS

The following figures depict certain embodiments, in which like reference numerals refer to like elements. These depicted embodiments are to be understood as illustrative of the disclosure and not as limiting in any way.

DETAILED DESCRIPTION OF THE DRAWINGS

In the following description of the various embodiments, reference is made to the accompanying drawings, which form a part hereof, and in which is shown by way of illustration various embodiments in which one or more aspects of the disclosure may be practiced. It is to be understood that other embodiments may be utilized and structural and functional modifications may be made without departing from the scope of the present disclosure.

Various connections between elements are discussed in the following description. These connections are general and, unless specified otherwise, may be direct or indirect, wired or wireless, and this specification is not intended to be limiting in this respect.

In accordance with various aspects of this disclosure, apparatuses, systems, computer-readable media, and methods are described for causing a virtual keyboard to be displayed on a display screen. In some embodiments, the keyboard may be displayed automatically when a control, such as an editable control, receives focus. In some embodiments, an editable control and/or other aspects of a display may be adjusted responsive to the display of the keyboard.

In accordance with various aspects of this disclosure, apparatuses, systems, computer-readable media, and methods are described for controlling, or selectively providing access to, a resource. In some embodiments, a determination as to whether to grant access to a resource may be based at least in part on a location of a device, such as a location of a mobile device. In some embodiments, one or more indications may be used in conjunction with a display screen to indicate that the resource is subject to selective access.

Figure 1A:
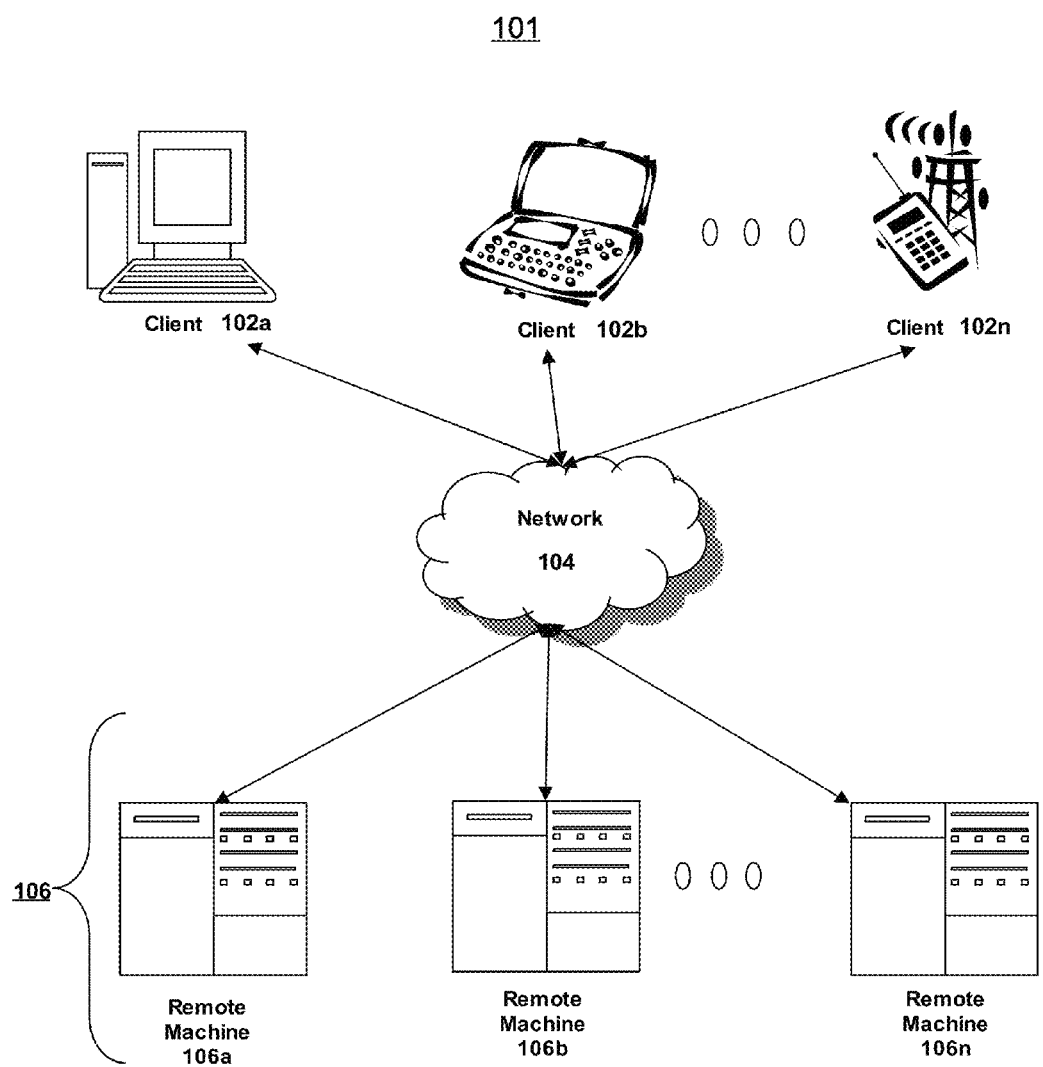
FIG. 1A illustrates a network environment in which various aspects of the disclosure may be implemented.

FIG. 1A illustrates a computing environment 101 that may comprise one or more client machines 102A-102N (generally referred to herein as "client machine(s) 102") that may be in communication with one or more servers 106A-106N (generally referred to herein as "server(s) 106"). Installed in between the client machine(s) 102 and server(s) 106 may be one or more networks, such as a network 104.

In some embodiments, the computing environment 101 may include an appliance. The appliance may be installed between the server(s) 106 and client machine(s) 102. The appliance may mange client/server connections, and in some cases may load balance client connections amongst a plurality of backend servers.

The client machine(s) 102 may be referred to as a single client machine 102 or a single group of client machines 102, while server(s) 106 may be referred to as a single server 106 or a single group of servers 106. In some embodiments a single client machine 102 may communicate with more than one server 106. In some embodiments, a single server 106 may communicate with more than one client machine 102. In some embodiments, a single client machine 102 may communicate with a single server 106.

A client machine 102 may, in some embodiments, be referenced by any one of the following terms: client machine(s) 102; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

In some embodiments, the client machine 102 may include a virtual machine. In some embodiments the virtual machine may comprise any virtual machine, such as a virtual machine managed by a hypervisor developed by XenSolutions, Citrix Systems, IBM, VMware, or any other hypervisor. In some embodiments, the virtual machine may be managed by a hypervisor executing on a server 106 or a hypervisor executing on a client 102.

The client machine 102 may in some embodiments execute, operate or otherwise provide an application selected from one or more of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments may include a client device 102 that displays output generated by an application remotely executing on a server 106 or other remotely located machine. In these embodiments, the client device 102 may display the application output in an application window, a browser, or other output window.

As used herein, a desktop refers to a graphical environment or space in which one or more applications may be hosted and/or executed. A desktop may include a graphical shell providing a user interface for an instance of an operating system in which local and/or remote applications can be integrated. Applications, as used herein, are programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

In some embodiments, server 106 may execute a remote presentation client, or other client or program, that uses a thin-client or remote-display protocol to capture display output generated by an application executing on server 106. Server 106 may transmit the application display output to a remote client 102. The thin-client or remote-display protocol may include one or more of: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment may include more than one server 106A-106N. In some embodiments, servers 106A-106N may be logically grouped together into a server farm 106. The server farm 106 may include servers 106 that are geographically dispersed and logically grouped together, or servers 106 that are located proximate to each other and logically grouped together. Geographically dispersed servers 106A-106N within a server farm 106 may, in some embodiments, communicate using a WAN, MAN, or LAN, for example. In some embodiments, different geographic regions may be characterized as: different continents; different regions of a continent; different countries; different states; different cities; different campuses; different rooms; or any combination of the preceding geographical locations. In some embodiments, the server farm 106 may be administered as a single entity. In some embodiments, the server farm 106 may include multiple server farms 106 and/or be administered as a plurality of entities.

In some embodiments, a server farm 106 may include servers 106 that execute a substantially similar type of operating system platform (e.g., WINDOWS NT, manufactured by Microsoft Corp. of Redmond, Wash., UNIX, LINUX, or SNOW LEOPARD.) In some embodiments, the server farm 106 may include a first group of servers 106 that execute a first type of operating system platform, and a second group of servers 106 that execute a second type of operating system platform, where the first and second types of operating system platforms may be different platforms. In some embodiments, the server farm 106 may include servers 106 that execute different types of operating system platforms.

The server 106, in some embodiments, may be any server type. For example, server 106 may be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. In embodiments where the server 106 comprises an appliance, the server 106 may be an appliance manufactured by any one of the following manufacturers: the Citrix Application Networking Group; Silver Peak Systems, Inc; Riverbed Technology, Inc.; F5 Networks, Inc.; or Juniper Networks, Inc. Some embodiments may include a first server 106A that receives a request from a client machine 102, forwards the request to a second server 106B, and responds to the request generated by the client machine 102 with a response from the second server 106B. The first server 106A may acquire an enumeration of applications available to the client machine 102 as well as address information associated with an application server 106 hosting an application identified within the enumeration of applications. The first server 106A may then present a response to the client's request using a web interface, and communicate with the client 102 to provide the client 102 with access to an identified application. In some embodiments, the first server 106A may communicate directly with the client 102 to provide client 102 with access to the identified application.

The server 106 may, in some embodiments, execute one or more of the following applications: a thin-client application using a thin-client protocol to transmit application display data to a client; a remote display presentation application; any portion of the CITRIX ACCESS SUITE by Citrix Systems, Inc. like the METAFRAME or CITRIX PRESENTATION SERVER or XenApp or XenDesktop; MICROSOFT WINDOWS Terminal Services manufactured by the Microsoft Corporation; or an ICA client, developed by Citrix Systems, Inc. In some embodiments, a server 106 may include an application server such as: an email server that provides email services such as MICROSOFT EXCHANGE manufactured by the Microsoft Corporation; a web or Internet server; a desktop sharing server; a collaboration server; or any other type of application server. In some embodiments, a server 106 may execute any one of the following types of hosted servers applications: GOTOMEETING provided by Citrix Online Division, Inc.; WEBEX provided by WebEx, Inc. of Santa Clara, Calif.; or Microsoft Office LIVE MEETING provided by Microsoft Corporation.

Client machines 102 may, in some embodiments, include a client node that seeks access to resources provided by a server 106. In some embodiments, the server 106 may provide clients 102 or client nodes with access to hosted resources. The server 106 may, in some embodiments, function as a master node such that it communicates with one or more clients 102 or servers 106. In some embodiments, the master node may identify and provide address information associated with a server 106 hosting a requested application, to one or more clients 102 or servers 106. In some embodiments, the master node may include a server farm 106, a client 102, a cluster of client nodes 102, or an appliance.

One or more clients 102 and/or one or more servers 106 may transmit data over a network 104 installed between machines and appliances within the computing environment 101. The network 104 may comprise one or more networks and/or sub-networks, and may be installed between any combination of the clients 102, servers 106, computing machines and appliances included within the computing environment 101. In some embodiments, the network 104 may include one or more of: a local-area network (LAN); a metropolitan area network (MAN); a wide area network (WAN); a primary network 104 comprised of multiple sub-networks 104 located between the client machines 102 and the servers 106; a primary public network 104 with a private sub-network 104; a primary private network 104 with a public sub-network 104; or a primary private network 104 with a private sub-network 104. In some embodiments, network 104 may include one or more of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network 104 that includes a wireless link where the wireless link may be an infrared channel or satellite band. The network topology of the network 104 may differ within different embodiments. In some embodiments, network topologies that may be utilized may include: a bus network topology; a star network topology; a ring network topology; a repeater-based network topology; or a tiered-star network topology. In some embodiments, network 104 may include mobile telephone networks that use a protocol to communicate among mobile devices, where the protocol may include one or more of the following: AMPS; TDMA; CDMA; GSM; GPRS UMTS; or any other protocol able to transmit data among mobile devices.

Figure 1B:
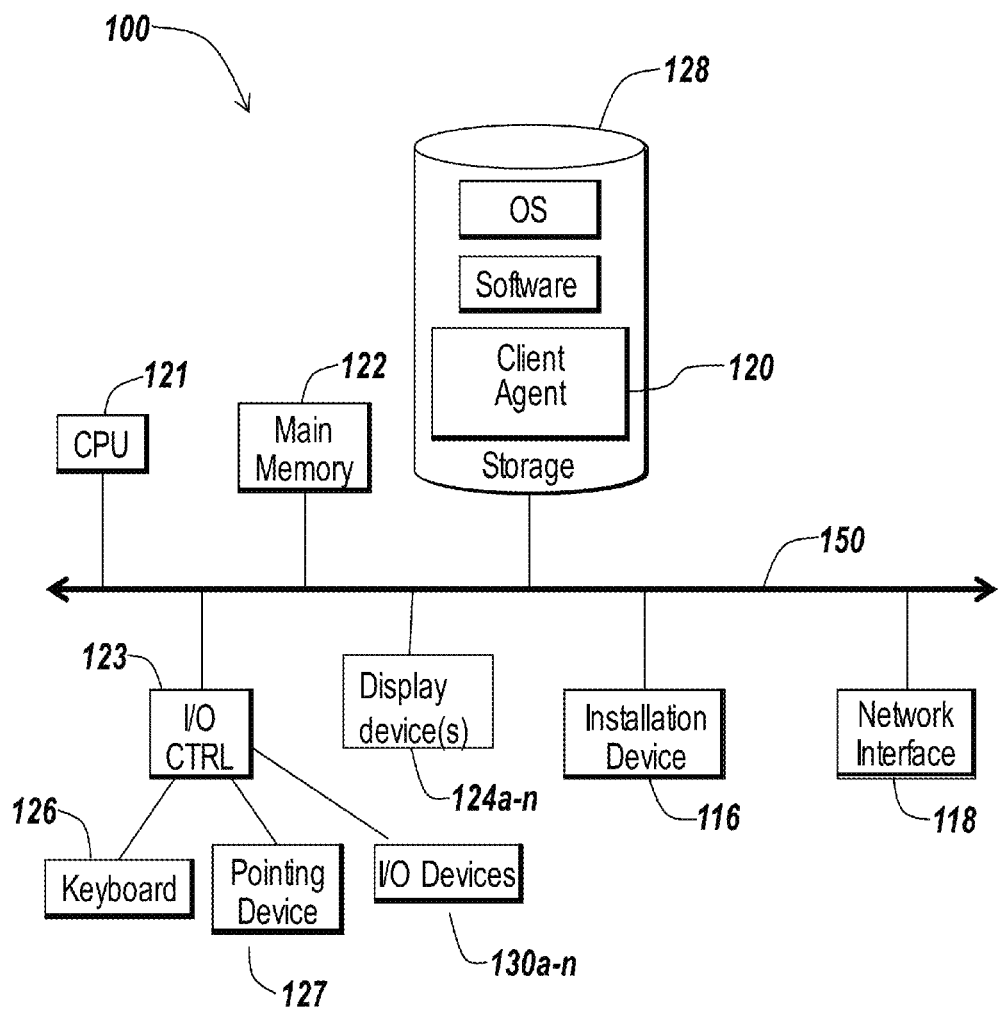
FIG. 1B and FIG. 1C illustrate computing devices in which various aspects of the disclosure may be implemented.

Illustrated in FIG. 1B is a computing device 100. In some embodiments, client machine 102 and/or server 106 illustrated in FIG. 1A may be deployed as and/or executed on any embodiment of the computing device 100 illustrated and described herein. Included within computing device 100 may be a system bus 150 that may communicate with one or more of the following components: a central processing unit 121; a main memory 122; a storage memory 128; an input/output (I/O) controller (CTRL) 123; display device(s) 124A-124N; an installation device 116; and a network interface 118. In some embodiments, the storage memory 128 may include one or more of: an operating system, software routines, and a client agent 120. The I/O controller 123, in some embodiments, may be connected or communicatively coupled to a key board 126, and a pointing device 127. Some embodiments may include I/O controller 123 connected to, or communicatively coupled to, one or more input/output devices 130A-130N. In some embodiments, computing device 100 may include firmware, hardware, and/or software to facilitate a determination of a location of computing device. For example, GPS functionality may be provided by computing device 100 to facilitate determining a location of computing device 100.

Figure 1C:
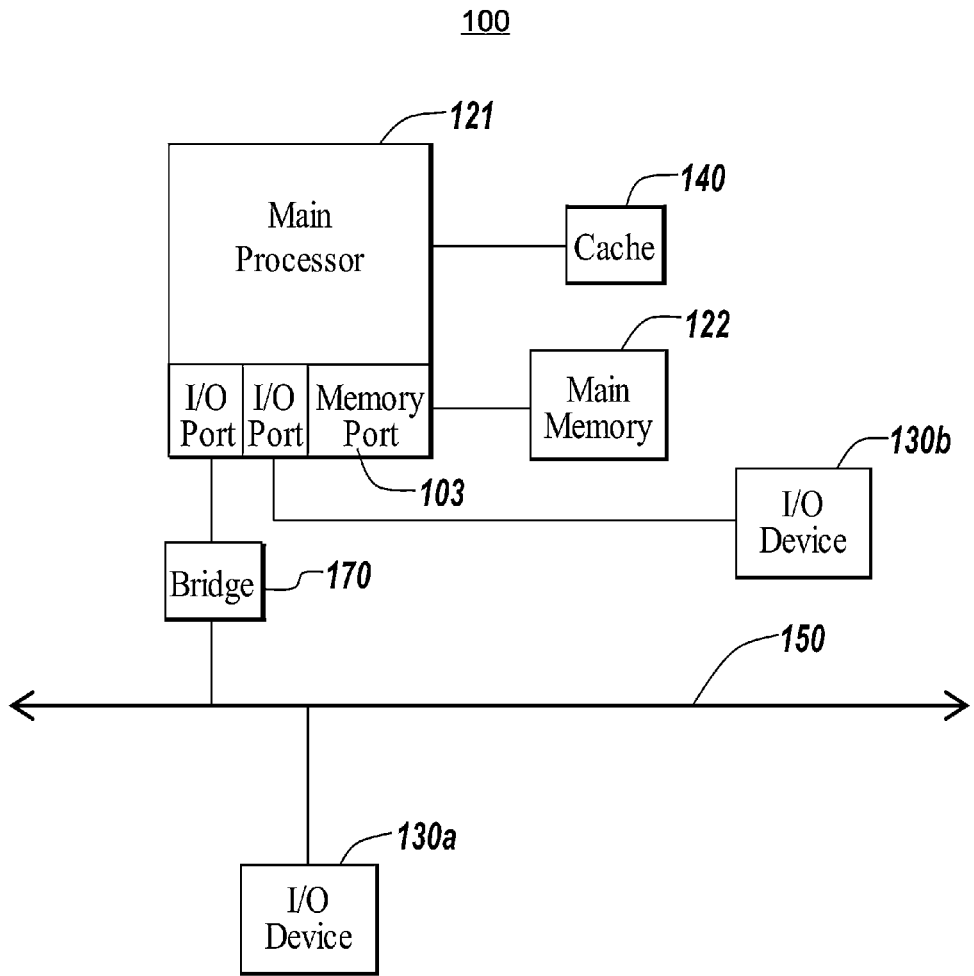

FIG. 1C illustrates another embodiment of computing device 100, where the client machine 102 and/or server 106 illustrated in FIG. 1A may be deployed as and/or executed on any embodiment of the computing device 100 illustrated and described herein. Included within the computing device 100 of FIG. 1C is a system bus 150 that may communicate with one or more of the following components: a bridge 170, and a first I/O device 130A. In some embodiments, the bridge 170 may be in communication with main processing unit 121, such as a main central processing unit. Processing unit 121 may communicate with one or more of a second I/O device 130B, a main memory 122, and a cache memory 140. Included within the processing unit 121 may be one or more I/O ports, a memory port 103, and/or a main processor.

Embodiments of the computing machine 100 may include a processing unit 121 comprising one or more of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. In some embodiments, processing unit 121 may include any combination of the following: a microprocessor, a microcontroller, a central processing unit with a single processing core, a central processing unit with two processing cores, or a central processing unit with more than one processing core.

While FIG. 1C illustrates a computing device 100 that includes a single processing unit 121, in some embodiments the computing device 100 may include any number of processing units 121. In some embodiments, the computing device 100 may store or access executable firmware or other executable instructions that, when executed, direct one or more processing units 121 to execute instructions. The executable instructions may apply to one or more pieces of data. In some embodiments, instructions may execute simultaneously, or substantially simultaneously, on more than one processing unit 121. In some embodiments, the computing device 100 may store or access executable firmware or other executable instructions that, when executed, direct one or more processing units to each execute a section of a group of instructions. For example, each processing unit 121 may be instructed to execute a portion of a program or a particular module within a program.

In some embodiments, the processing unit 121 may include one or more processing cores. For example, the processing unit 121 may have two cores, four cores, eight cores, etc. In some embodiments, the processing unit 121 may comprise one or more parallel processing cores. The processing cores of the processing unit 121 may, in some embodiments, access available memory as a global address space. In some embodiments, memory within the computing device 100 may be segmented and assigned to a particular core within the processing unit 121. In some embodiments, one or more processing cores or processors in the computing device 100 may access local memory. In some embodiments, memory within the computing device 100 may be shared amongst one or more processors or processing cores, while other memory may be accessed by particular processors or subsets of processors. In some embodiments, such as embodiments where the computing device 100 includes more than one processing unit, the multiple processing units may be included in a single integrated circuit (IC). In some embodiments, multiple processors may be linked together by an internal high speed bus, which may be referred to as an element interconnect bus.

In some embodiments, such as embodiments where the computing device 100 includes one or more processing units 121, or a processing unit 121 including one or more processing cores, the processors may execute a single instruction simultaneously on multiple pieces of data (SIMD). In some embodiments, multiple processors may execute multiple instructions simultaneously on multiple pieces of data (MIMD). In some embodiments, the computing device 100 may include any number of SIMD and MIMD processors.

In some embodiments, the computing device 100 may include a graphics processor or a graphics processing unit (not shown). The graphics processing unit may include any combination of firmware, software, and hardware. The graphics processing unit may input graphics data and graphics instructions, render a graphic from the inputted data and instructions, and output the rendered graphic. In some embodiments, the graphics processing unit may be included within the processing unit 121. In some embodiments, the computing device 100 may include one or more processing units 121, where at least one processing unit 121 may be dedicated to processing and rendering graphics.

In some embodiments, processing unit 121 may communicate with cache memory 140 via a secondary bus also known as a backside bus. In some embodiments, the computing machine 100 may include a processing unit 121 that may communicate with cache memory 140 via the system bus 150. The system bus 150 may, in some embodiments, also be used by the processing unit to communicate with more than one type of I/O device 130A-130N. In some embodiments, the system bus 150 may include one or more of the following types of buses: a VESA VL bus; an ISA bus; an EISA bus; a MicroChannel Architecture (MCA) bus; a PCI bus; a PCI-X bus; a PCI-Express bus; or a NuBus. In some embodiments, an I/O device 130A-130N may include a video display (e.g., a display device 124) that communicates with the processing unit 121. In some embodiments, the computing machine 100 may include a processor 121 connected to an I/O device 130A-130N via one or more of the following connections: HyperTransport, Rapid I/O, or InfiniBand. In some embodiments, the computing machine 100 may include a processor 121 that may communicate with a first I/O device (e.g., I/O device 130A) using a local interconnect bus and a second I/O device (e.g., I/O device 130B) using a direct connection.

In some embodiments, computing device 100 may include a main memory unit 122 and cache memory 140. One or more of the memories may include one or more of: SRAM; BSRAM; or EDRAM. In some embodiments, cache memory 140 and a main memory unit 122 may include one or more of: Static random access memory (SRAM), Burst SRAM or SynchBurst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. In some embodiments, processing unit 121 may access the main memory 122 via: a system bus 150; a memory port 103; or any other connection, bus, or port that allows the processing unit 121 to access memory 122.

In some embodiments, support may be provided for one or more installation devices 116, such as the following types of installation devices: a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. In some embodiments, applications may include a client agent 120, or any portion of a client agent 120. The computing device 100 may include a storage device 128 that may include one or more hard disk drives and/or one or more redundant arrays of independent disks. The storage device may be configured to store an operating system, software, programs applications, or at least a portion of the client agent 120. In some embodiments, an installation device 116 may be used as the storage device 128.

The computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections may also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). The computing device 100 may include a network interface 118 able to communicate with additional computing devices 100' via any type and/or form of gateway or tunneling protocol, such as Secure Socket Layer (SSL) or Transport Layer Security (TLS), or the Citrix Gateway Protocol manufactured by Citrix Systems, Inc. Versions of the network interface 118 may comprise one or more of: a built-in network adapter; a network interface card; a PCMCIA network card; a card bus network adapter; a wireless network adapter; a USB network adapter; a modem; or any other device suitable for interfacing the computing device 100 to a network capable of communicating and performing the various acts described herein.

In some embodiments, I/O devices 130A-130N may include one or more of: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the various acts described herein. An I/O controller 123 may, in some embodiments, connect to multiple I/O devices 130A-130N to control the one or more I/O devices. Some embodiments of the I/O devices 130A-130N may be configured to provide storage or an installation medium 116. In some embodiments, one or more of I/O devices 130A-130N may provide a universal serial bus (USB) interface for receiving USB storage devices such as the USB Flash Drive line of devices manufactured by Twintech Industry, Inc. In some embodiments, an I/O device 130 may include or provide a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 100 may connect to multiple display devices 124A-124N. In some embodiments, the computing device 100 may connect to a single display device 124. In some embodiments, the computing device 100 may connect to display devices 124A-124N that are the same type or form of display, or to display devices that are different types or forms. Embodiments of the display devices 124A-124N may be supported and enabled by one or more of the following: one or multiple I/O devices 130A-130N; the I/O controller 123; a combination of I/O device(s) 130A-130N and the I/O controller 123; any combination of hardware and software able to support a display device 124A-124N; any type and/or form of video adapter, video card, driver, and/or library to interface, communicate, connect or otherwise use the display devices 124A-124N. The computing device 100 may in some embodiments be configured to use one or multiple display devices 124A-124N, and these configurations may include: having multiple connectors to interface to multiple display devices 124A-124N; having multiple video adapters, with each video adapter connected to one or more of the display devices 124A-124N; having an operating system configured to support multiple displays 124A-124N; using circuits and software included within the computing device 100 to connect to and use multiple display devices 124A-124N; and executing software on the main computing device 100 and multiple secondary computing devices to enable the main computing device 100 to use a secondary computing device's display as a display device 124A-124N for the main computing device 100. In some embodiments, the computing device 100 may include multiple display devices 124A-124N provided by one or more secondary computing devices and connected to the main computing device 100 via a network.

In some embodiments, the computing machine 100 may execute any operating system. For example, the computing machine 100 may execute any of the following operating systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; WINDOWS VISTA; and WINDOWS 7; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system. In some embodiments, the computing machine 100 may execute multiple operating systems. For example, the computing machine 100 may execute PARALLELS or another virtualization platform that may execute or manage a virtual machine executing a first operating system, while the computing machine 100 may execute a second operating system different from the first operating system.

In some embodiments, the computing machine 100 may be embodied in one or more of the following devices: a computing workstation; a desktop computer; a laptop or notebook computer; a server; a handheld computer; a mobile telephone; a portable telecommunication device; a media playing device; a gaming system; a mobile computing device; a netbook; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the acts described herein. In some embodiments the computing machine 100 may include a mobile device, such as any one of the following mobile devices: a JAVA-enabled cellular telephone or personal digital assistant (PDA), such as the i55sr, i58sr, i85s, i88s, i90c, i95cl, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device configured to perform the acts described herein. In still other embodiments, the computing device 100 may include any one of the following devices: any one series of Blackberry, or other handheld device manufactured by Research In Motion Limited; the iPhone manufactured by Apple Computer; Palm Pre; a Pocket PC; a Pocket PC Phone; or any other handheld mobile device.

In some embodiments, the computing device 100 may have different processors, operating systems, and input devices consistent with the device. For example, the computing device 100 may include a TREO 180, 270, 600, 650, 680, 700p, 700w, or 750 smart phone manufactured by Palm, Inc. In some embodiments, the TREO smart phone may be operated under the control of the PalmOS operating system and may include a stylus input device as well as a five-way navigator device.

In some embodiments the computing device 100 may include a mobile device, such as a JAVA-enabled cellular telephone or personal digital assistant (PDA), such as the i55sr, i58sr, i85s, i88s, i90c, i95cl, or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 100 may include a mobile device manufactured by Nokia of Finland, or by Sony Ericsson Mobile Communications AB of Lund, Sweden.

In some embodiments, the computing device 100 may include a Blackberry handheld or smart phone, such as the devices manufactured by Research In Motion Limited, including the Blackberry 7100 series, 8700 series, 7700 series, 7200 series, the Blackberry 7520, or the Blackberry Pearl 8100. In some embodiments, the computing device 100 may include a smart phone, Pocket PC, Pocket PC Phone, or other handheld mobile device supporting Microsoft Windows Mobile Software. Moreover, the computing device 100 may include any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 may include a digital audio player. In some embodiments, the computing device 100 may include a digital audio player such as the Apple IPOD, IPOD Touch, IPOD NANO, and IPOD SHUFFLE lines of devices, manufactured by Apple Computer of Cupertino, Calif. In some embodiments, the digital audio player may function as both a portable media player and as a mass storage device. In some embodiments, the computing device 100 may include a digital audio player, such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In some embodiments, the computing device 100 may include a portable media player, such as the Zen Vision W, the Zen Vision series, the Zen Portable Media Center devices, or the Digital MP3 line of MP3 players, manufactured by Creative Technologies Ltd. In some embodiments, the computing device 100 may include a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 may comprise a combination of devices, such as a mobile phone combined with a digital audio player or portable media player. In some embodiments, the computing device 100 may include a Motorola RAZR or Motorola ROKR line of combination digital audio players and mobile phones. In some embodiments, the computing device 100 may include an iPhone smartphone, manufactured by Apple Computer of Cupertino, Calif.

Figure 2A:
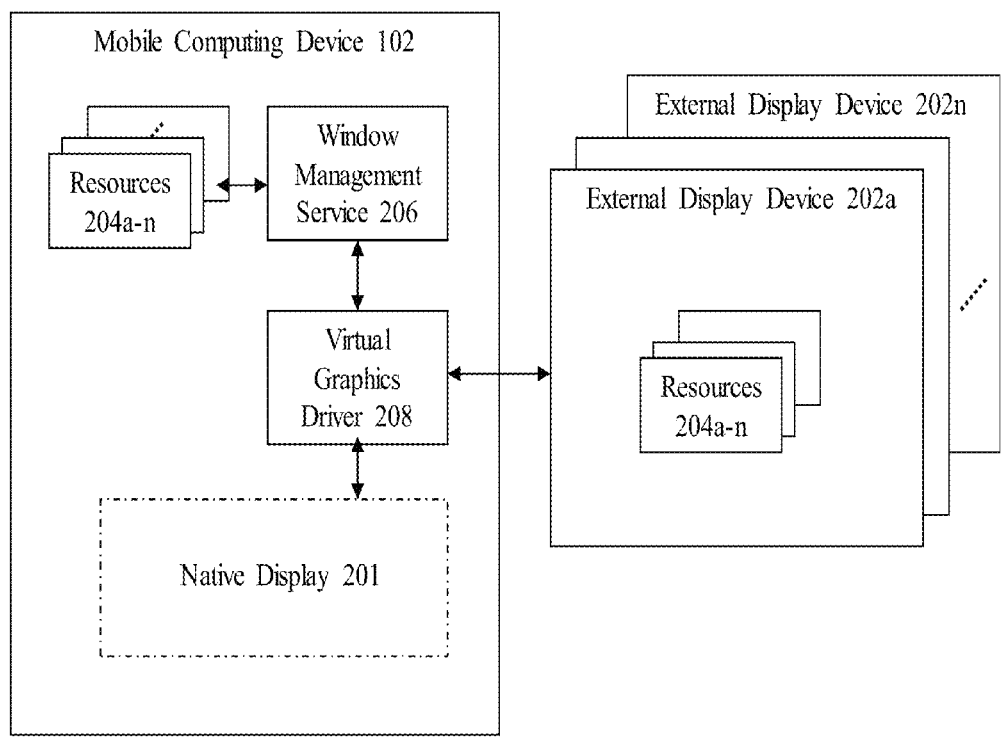
FIG. 2A illustrates a system for displaying a plurality of resources in a user-configurable display layout on an external display device.

Referring to FIG. 2A, a block diagram of a system is illustrated. The system may cause one or more resources, such as one or more portions or one or more windows of a display screen or graphic, to be displayed on one or more display devices. In brief overview, the system may include a device, such as a mobile computing device 102 that may communicate with one or more external display devices 202a-n. FIG. 2A shows a mobile computing device 102 with a native display 201, although devices without native displays may be used in some embodiments. The mobile computing device 102 may execute a plurality of resources 204a-n (collectively, 204). A window management service or system 206 and a virtual graphics driver 208 may manage the locations and sizes of output data associated with each of the plurality of resources 204. In some embodiments, a display of output data may be based at least in part on a user-configurable display layout. In some embodiments, the mobile computing device 102 may transmit the output data associated with one or more of the resources 204 to an external display device 202. In some embodiments, the mobile computing device 102 may transmit the output data upon establishing a connection with the external display device 202. In some embodiments, the mobile computing device 102 may transmit the output data associated with each of the plurality of resources 204 to the device's native display 201. In some embodiments, the mobile computing device 102 may transmit the output data associated with one or more of resources 204 to the native display 201 and transmit the output data associated with other of the plurality of resources 204 to the external display devices 202a-n.

As described above, mobile computing device 102 may be associated with a plurality of resources 204. In some embodiments, one or more of the resources 204 may include an executable resource. Briefly referring to FIG. 4, in some embodiments, one or more of the resources 204 may be hosted by, or stored at, one or more devices, such as a remote computer 401. In some embodiments, the mobile computing device 102 may include a client 102 as described above in connection with FIGS. 1A-1C. In some embodiments, the mobile computing device 102 may display the output data associated with a resource 204a in a plurality of resources 204a-n executed by the mobile computing device 102. In some embodiments, the mobile computing device 102 may display the output data associated with each of the plurality of resources 204.

In some embodiments, a resource in the plurality of resources 204 may include, without limitation, a data file, an executable file, configuration files, an application, a desktop environment (which may itself include a plurality of applications for execution by the user), a computing environment image (such as a virtual machine image), an operating system software or other applications needed to execute a computing environment image, and/or one or more windows or display graphics, that may optionally be subject to modification, relocation, or re-sizing in accordance with one or more aspects of this disclosure. In some embodiments, the resource may be subject to conditional or selective access in accordance with one or more aspects of this disclosure.

In some embodiments, the mobile computing device 102 may include a window management service 206 allowing an external display device 202 to display the output data associated with one or more of resources 204 executed on the mobile computing device 102. In some embodiments, the window management service 206 may allow one or more resources running on the mobile computing device 102 to be viewed on an external display device 202 or the native display 201 at substantially the same time. In some embodiments, an output of resource 204 may be viewed exclusively on the native display 201 or external display device 202. In some embodiments, the window management service 206, in conjunction with a virtual graphics driver 208, may manage the display layout of the windows displayed on the external display device 202 and the native display 201. In some embodiments, the virtual graphics driver 208 may be a driver-level component that manages a virtual screen frame buffer storing output data that may be displayed by the native display 201 on the mobile computing device 102 or an external display device 202. In some embodiments, the window management service 206, in conjunction with the virtual graphics driver 208, may manage the boundaries and size of a screen space used to display output data and on which display device the output data is displayed.

In some embodiments, an external display device 202 may receive output data associated with one or more of resources 204 and display the output data in a user-configurable display layout. In some embodiments, the external display device 202 may include a dock to which the mobile computing device 102 connects. In some embodiments, the external display device 202 may include a receiver for communicating with the mobile computing device 102 wirelessly, for example, via BLUETOOTH, Wi-Fi or other networking protocols, as described above in connection with FIGS. 1A-1C. In some embodiments, the external display device 202 may include a display device 124 as described above in connection with FIG. 1B-1C.

Figure 2B:
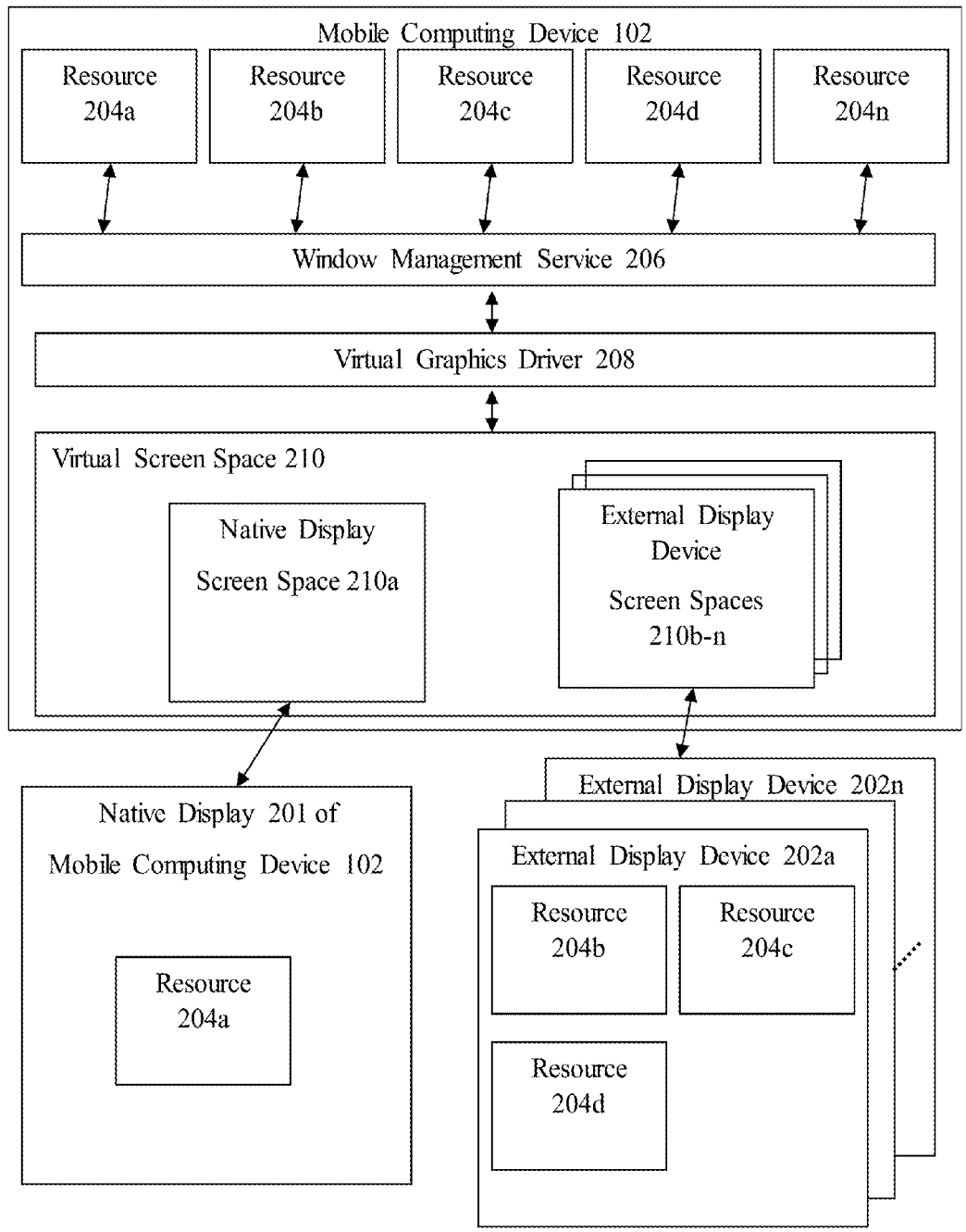
FIG. 2B illustrates a system for mapping a display of one or more resources to one or more display devices.

Referring to FIG. 2B, a block diagram of a system is illustrated. The system may be configured to map the display of one or more resources 204 of the mobile computing device 102 on one or more display devices 201 and/or 202. In some embodiments, the window management service 206 may manage a virtual screen space 210. The virtual screen space 210 may map to the native display 201 and one or more external display devices 202. The window management service 206 may position output data associated with the user interfaces of one or more resources 204 on the virtual screen space 210 to specify where each user interface will be displayed. In some embodiments, the window management service 206 may position the output data according to one or more user preferences. In some embodiments, the window management service 206 may position the output data according to a policy. In some embodiments, the window management service 206 may position the output data based on the resource 204 associated with the output data.

The window management service 206 may communicate with the virtual graphics driver 208 to transmit output data associated with user interfaces of resources 204 to the native display 201 and one or more external display devices 202. In some embodiments, the window management service 206 may transmit output data and associated coordinates from the virtual screen space 210 to the virtual graphics driver 208. In some embodiments, the virtual graphics driver 208 may store the output data in a virtual screen frame buffer. In some embodiments, the virtual graphics driver 208 may transmit the entries in the virtual screen frame buffer to the native display 201 and external display devices 202. In some embodiments, the virtual graphics driver 208 may transmit an entry in the virtual screen frame buffer to a native display 201 or an external display device 202 based on the position of the entry in the frame buffer.

Figure 2C:
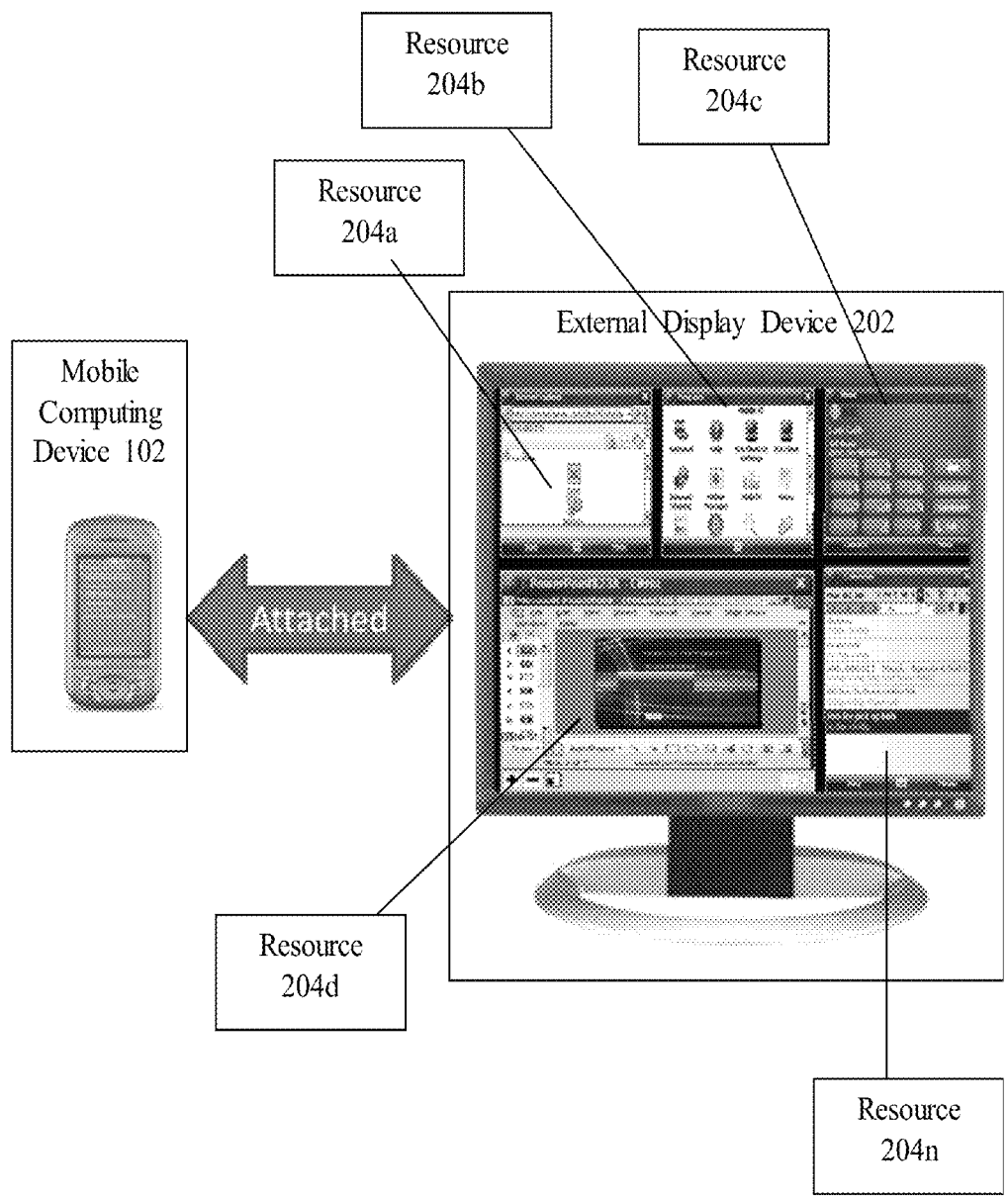
FIG. 2C illustrates a screen shot depicting a system for displaying a plurality of resources in a user-configurable display layout on an external display device, wherein the user-configurable display layout is illustratively divided into a grid.

FIG. 2C illustrates a screen shot of a display layout. In some embodiments, the display layout may be user configurable. An external display device 202 may display the output data of one or more of the resources 204 in the layout of FIG. 2C. In some embodiments, the output data of the resources 204 may be displayed in a grid display layout as shown. The grid display layout may include one or more cells in an arrangement. A cell may display output data associated with a resource. In some embodiments, more than one cell displays output data associated with the same resource. In some embodiments, a cell may display output data associated with one or more resources. In some embodiments, multiple cells may display output data associated with a particular resource. For example, multiple cells may display respective portions of output data associated with a particular resource.

In some embodiments, the cells may be uniformly sized. In some embodiments, the cells may be different sizes. The cells may be arranged in any configuration. In some embodiments, the cells may be arranged in rows, columns, or both. A cell may have a descriptor associated with the cell's position in the grid. The descriptor may indicate the position of a cell within a row. In the screen shot depicted in FIG. 2C, the cell for resource 204*a* may have the descriptor "1-1," the cell for resource 204*b* may have the descriptor "1-2," the cell for resource 204*c* may have the descriptor "1-3," the cell for resource 204*d* may have the descriptor "2-1," and the cell for resource 204*n* may have the descriptor "2-2." In other embodiments, the cells may be numbered, e.g. "Cell 1," "Cell 2," etc. However, any system of choosing descriptors known to those of ordinary skill in the art may be used.

In some embodiments, the window management service 206 may configure a grid display layout according to the resources 204 being displayed on the native display 201 or the external display device 202. In some embodiments, the service 206 may configure a grid display layout according to the number of resources 204 being displayed. In some embodiments, the service 206 may configure a grid display layout according to the size or amount of content in the user interfaces of the resources 204. For example, if an external display device 202 displays four resources with comparable amounts of content, the window management service 206 may configure a grid display layout with four uniform cells. In another example, if an external display device 202 displays four resources and one resource includes three times as much content as the others, the window management service 206 may configure a grid display layout with three uniform cells in a first row and a single cell in a second row. The single cell in the second row may be three times as wide as the cells in the first row. In some embodiments, the window management service 206 may configure a grid display layout to reserve a cell for displaying information about the resources being displayed, such as a menu of the resources. In some embodiments, the window management service 206 may configure a grid display layout to reserve a cell for allowing a user to configure the grid display layout.

Figure 2D:
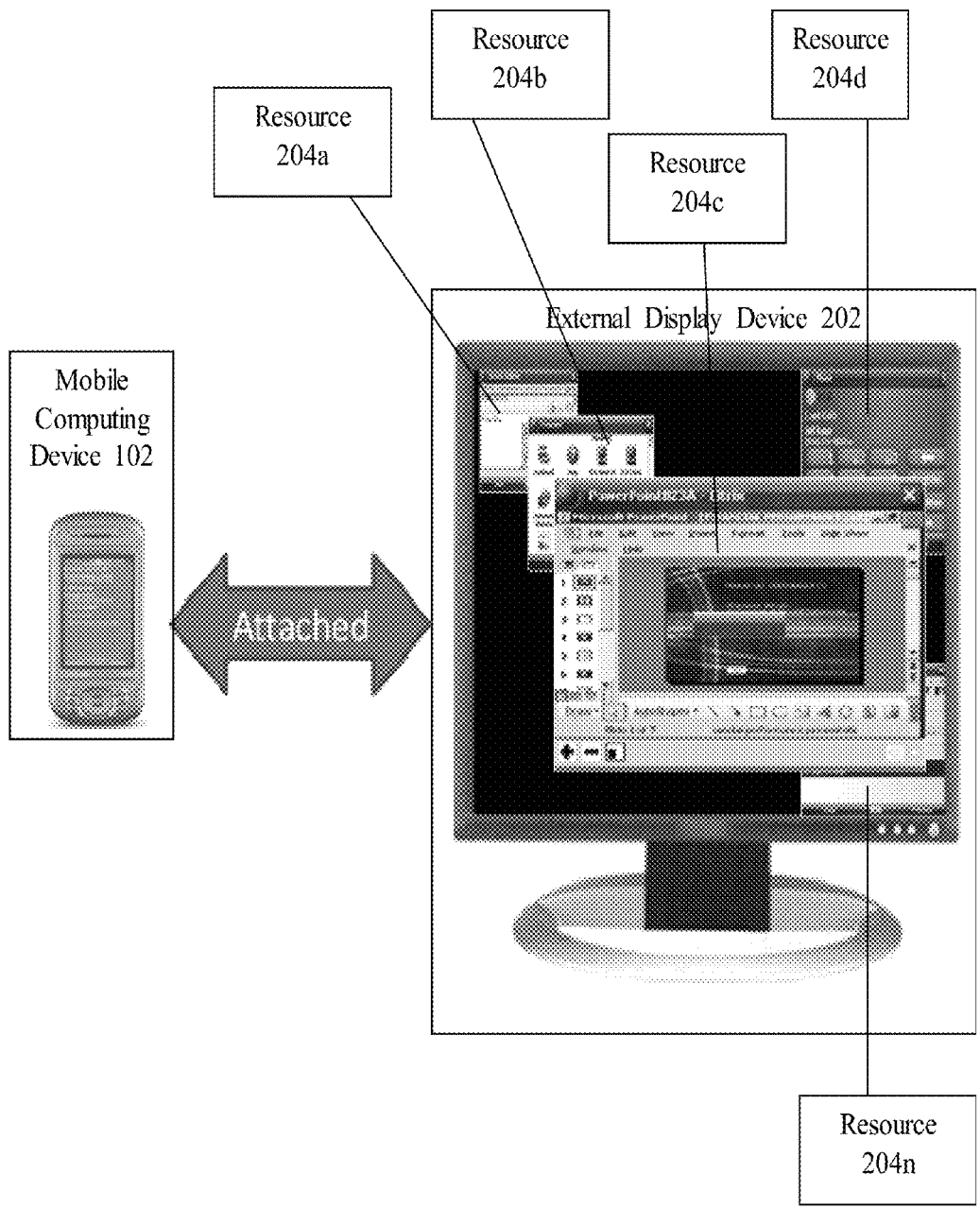
FIG. 2D illustrates a screen shot depicting a system for displaying a plurality of resources in a user-configurable, dynamic display layout on an external display device.

Referring to FIG. 2D, a screen shot of a display layout is illustrated. The display layout may be user configurable. The layout may provide or include a dynamic display layout in which the external display device 202 may display the output data associated with the plurality of resources 204. In some embodiments, windows on the external display device 202 that display output data for resources 204 may be dynamically positioned and sized. The window management service 206 may position a user interface for a resource at a default position and with a default size chosen according to a policy, the resource 204, or any other input, specification, or method. The window management service 206 may order overlapping user interfaces such that higher-order user interfaces obscure lower-order user interfaces. The window management service 206 may transmit output data to the virtual graphics driver 208 reflecting the obfuscation. The user may re-position or re-size a window by, for example, clicking and dragging the window or a window edge. In some embodiments, the virtual graphics driver 208 may detect the user's change to the window, and transmit information about the user's change to the window management service 206. The window management service 206 may process the change and transmit updated output data to the virtual graphics driver 208. In some embodiments, the user may move the user interface for a resource 204 to any location on a native display 201 or external display device 202. In some embodiments, the user may move the user interface for a resource 204 to a different display device. In some embodiments, the updated output data may indicate that one user interface's size has been increased or location has been adjusted to obscure another user interface. In some embodiments, the updated output data may indicate that one user interface's size has been decreased or location has been adjusted such that more of another user interface shall be visible.

Figure 3A:
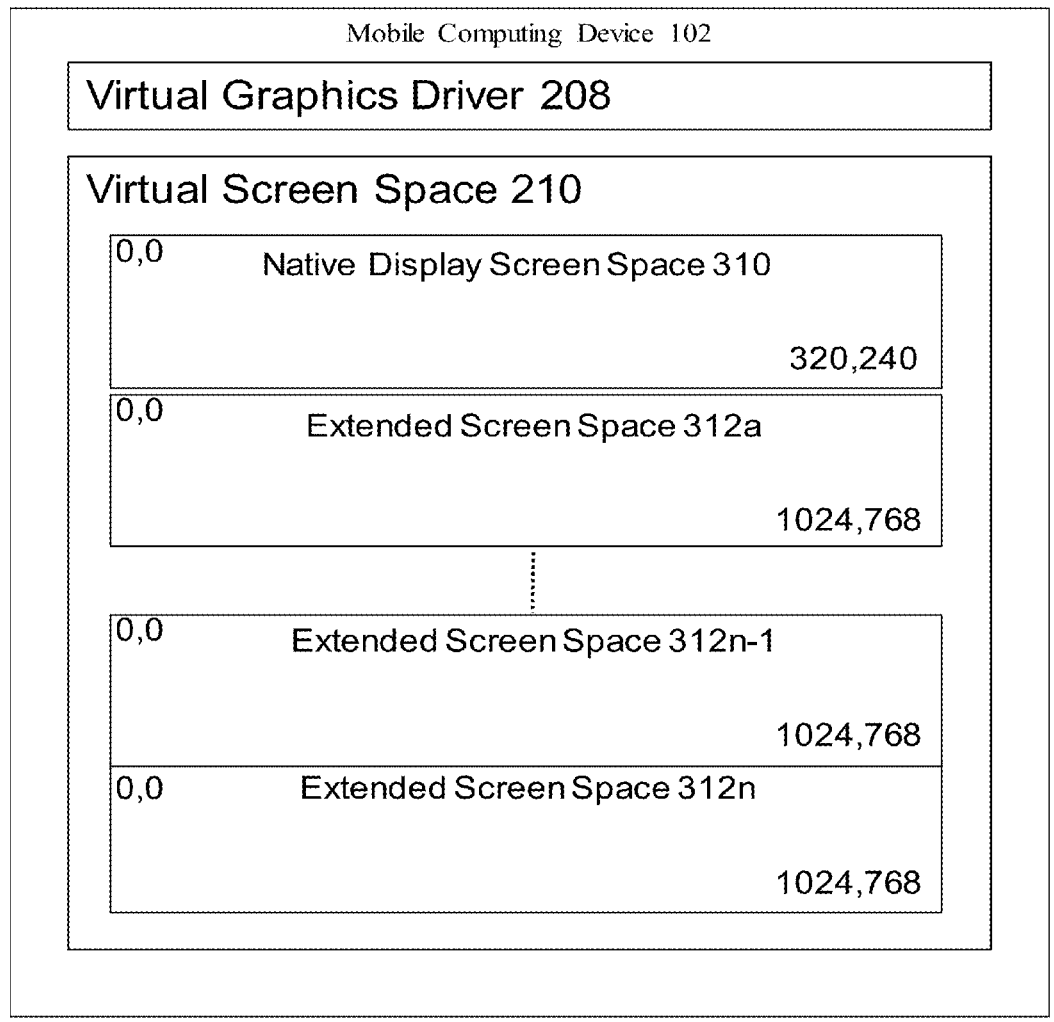
FIG. 3A illustrates a block diagram depicting a plurality of screen spaces provided by a mobile computing device attached to one or more external display devices.

Referring to FIG. 3A, a block diagram is illustrated. As shown in FIG. 3A, a mobile computing device 102 may provide one or more virtual screen spaces 210. The mobile computing device may be attached to, or coupled to, one or more external display devices.

As shown in FIG. 3A, and as described above, the mobile computing device 102 may include a virtual graphics driver 208 and a virtual screen 210. The virtual screen 210 may include a plurality of virtual screen spaces 310 and 312*a-n*. Virtual screen space 310 may be a native display screen space for the native display 201 on the mobile computing device 102. The other virtual screen spaces 312*a-n* may be extended screen spaces that correspond to the displays of external display devices 202. The window management service 206 and virtual graphics driver 208 may manage the virtual screen 210. In some embodiments, the virtual graphics driver 208 may use a virtual screen frame buffer to manage the mobile computing device's native display 201 and change the native display's 201 screen resolution. In some embodiments, the virtual graphics driver 208 may use a virtual screen frame buffer to manage an extended screen space 312 and to change a resolution of the extended screen space 312.

In some embodiments, the virtual graphics driver 208 may allocate and manage one or more of virtual screen spaces 310, 312a-n and virtual screen frame buffers. In some embodiments, one or more virtual screen spaces and virtual screen frame buffers may have a resolution independent of the other screen spaces and frame buffers. In some embodiments, output data associated with one or more of the plurality of resources 204 may reside within any of the virtual screen spaces 310, 312a-n. In some embodiments, one or more of the extended screen spaces 312a-n may be associated with at least one external display device 202, optionally dependent on the capabilities of the device.

In some embodiments, the window management service 206 and the virtual graphics driver 208 may allocate and manage the display, on a plurality of external display devices 202, of output data associated with a plurality of resources. In some embodiments, output data associated with a resource 204a may be displayed on a mobile computing device 102, output data associated with a resource 204b may be displayed on one external display device 202a, and output data associated with a resource 204c may be displayed on another external display device 202b. In some embodiments, the window management device 206 may identify one of the external display devices 202 for displaying output data generated by a resource 204a based upon a type of the resource 204a. For example, the window management service 206 may determine that a type of resource rendering a video may display on a television screen, while a type of resource rendering a word processing application may render on a display of a laptop computer.

Figure 3B:
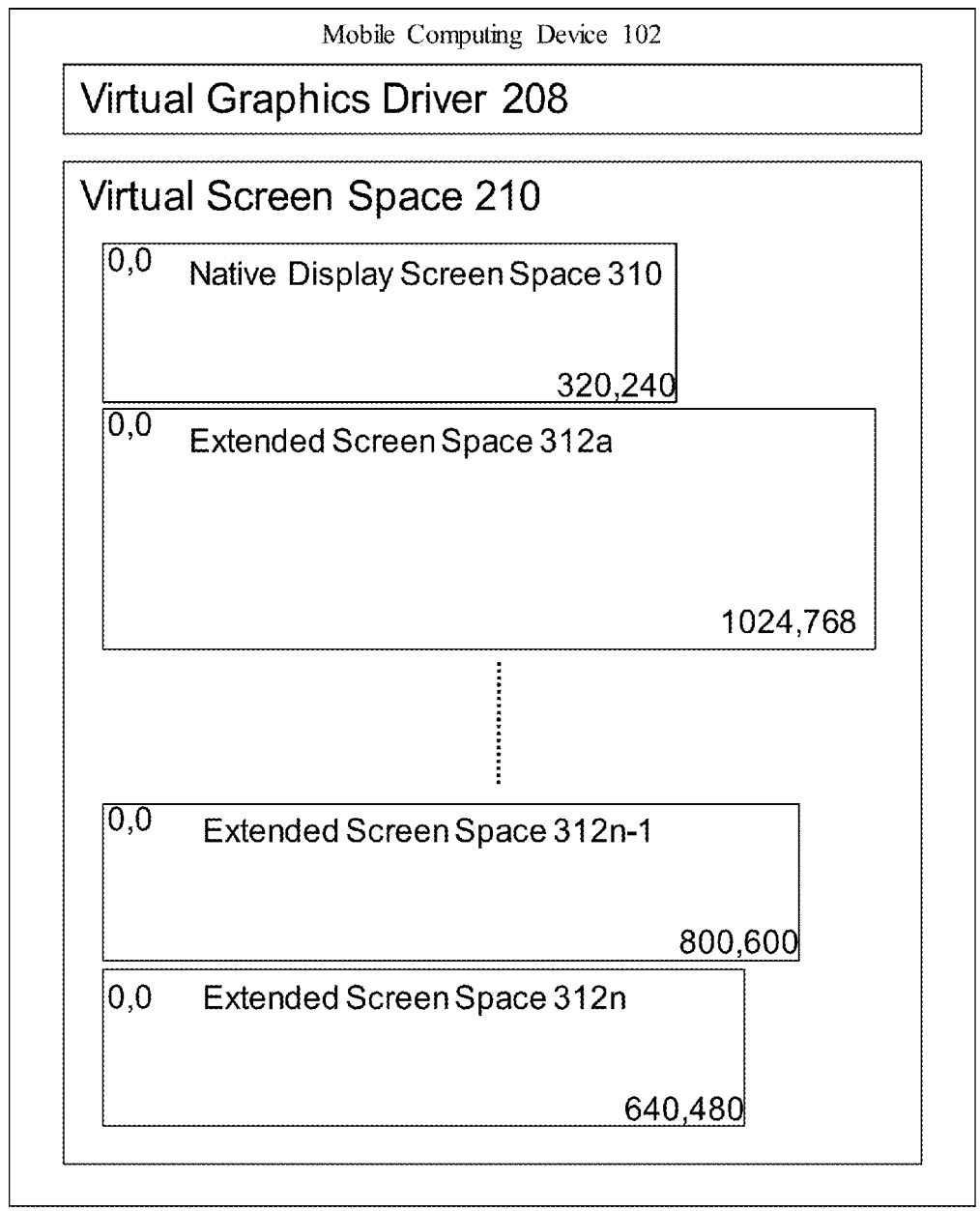
FIG. 3B illustrates a block diagram depicting a mobile computing device providing a plurality of screen spaces.

Referring to FIG. 3B, a block diagram of a mobile computing device 102 is illustrated. As shown, mobile computing device 102 may provide a virtual screen 210 with virtual screen spaces 310, 312a-n of potentially varying resolutions. As shown in FIG. 3B, the virtual screen 210 may include a native display screen space 310 corresponding to the native display 201 of the mobile computing device 102 with a resolution of 320 pixels×240 pixels. The virtual screen 210 may include an extended screen 312a corresponding to the display of an external display device 202 with a resolution of 1024 pixels×768 pixels, an extended screen 312n-1 corresponding to the display of an external display device 202 with a resolution of 800 pixels×600 pixels, and an extended screen 312n corresponding to the display of an external display device 202 with a resolution of 640 pixels×480 pixels. In some embodiments, the virtual screen 210 may include a native display screen space 310 and any number of extended screens 312 of any resolution. In some embodiments, the entire virtual screen space 210 may be mapped into a single virtual screen frame buffer. In some embodiments, virtual screen space 210 may map into multiple buffers.

Figure 3C:
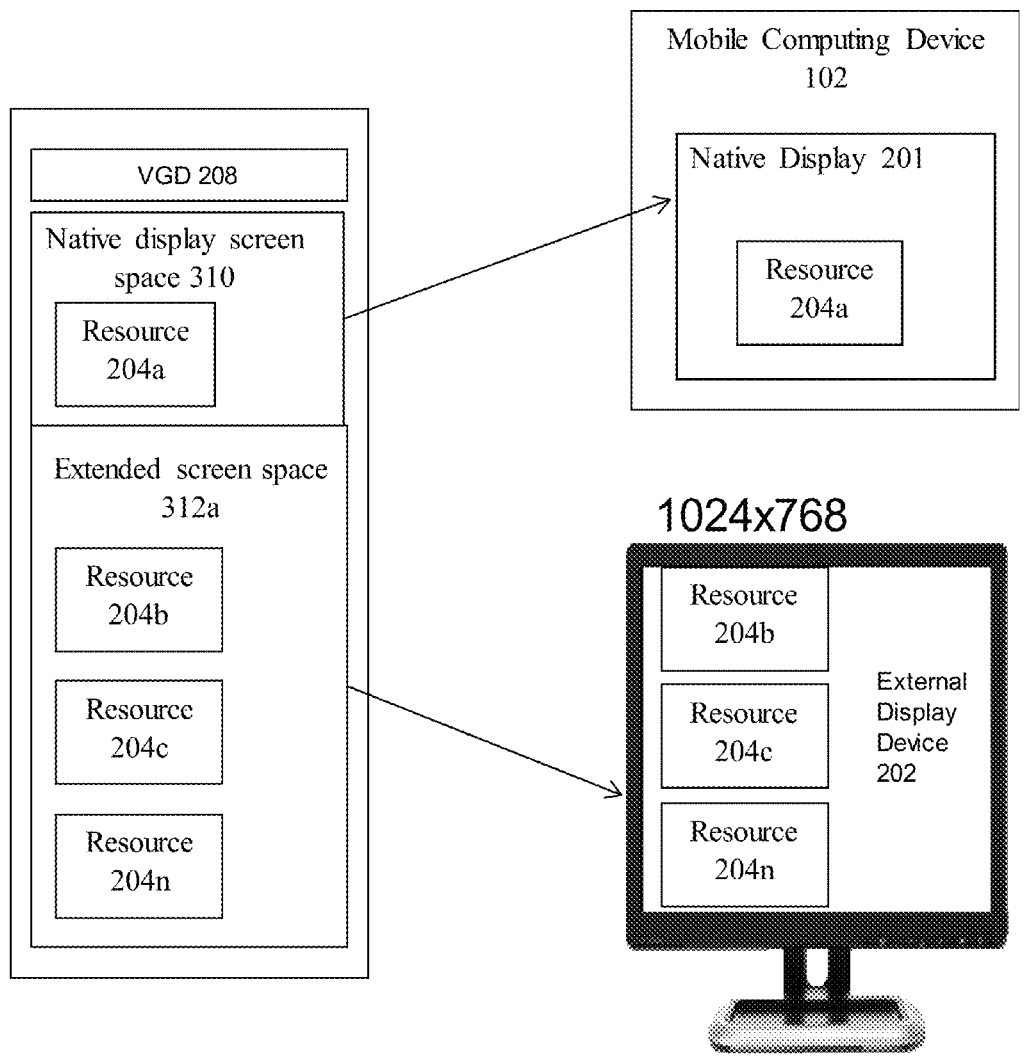
FIG. 3C illustrates a block diagram depicting a logical representation of a plurality of screen spaces managed by a virtual graphics driver.

Referring to FIG. 3C, a block diagram of a representation of a plurality of virtual screen spaces managed by a virtual graphics driver is illustrated. The representation of FIG. 3C may be an actual or a logical representation. In some embodiments, the virtual graphics driver 208 may manage multiple virtual screen spaces with different resolutions in a virtual screen frame buffer. In some embodiments, the native display 201 of the mobile computing device may be the primary display and the external display device 202, corresponding to the extended screen 312a, may serve as a secondary display.

In some embodiments, output data associated with resources 204 on the native display screen space 310 may be displayed on the native display 201 and output data associated with resources 204 on the extended screen space 312a may be displayed on the external display device 202 associated with the extended screen spaces 312a.

Figure 4:
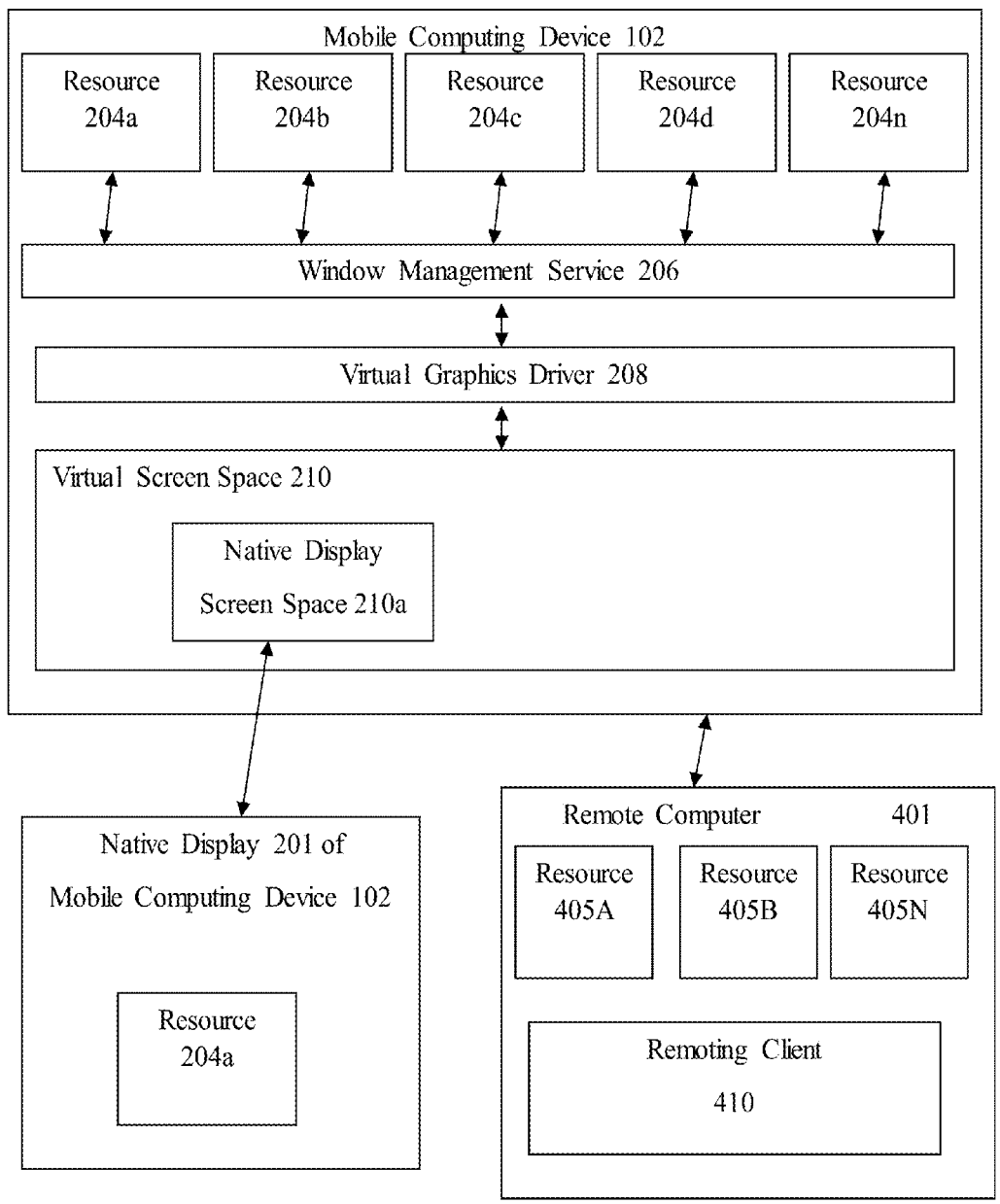
FIG. 4 illustrates a block diagram depicting a system for altering the display of a remote application on a mobile device.

Illustrated in FIG. 4 is a system. The system of FIG. 4 may correspond to, or operate in conjunction with, the system described in connection with FIG. 2B. The system of FIG. 4 may include a mobile computing device 102, such as any mobile device described herein. The mobile computing device 102 may execute and/or store one or more resources 204. In some embodiments the resources 204 may include applications executing on the mobile computing device 102. In some embodiments, at least one resource may include an operating system executing on the mobile device 102 such that the other resources execute within the context of the operating system. The mobile device 102 may execute a windows management service 206 that may communicate with other applications executing on the mobile device 102. The windows management service 206 may communicate with a virtual graphics driver 208 and the resources or applications 204 executing on the mobile device 102. The mobile computing device 102 may execute a virtual graphics driver 208, and may store a buffer for generating a virtual screen space 210 that may include a buffer for a native display screen space 210a. The mobile device 102 may communicate with a native display 201 of the mobile device 102 on which application output generated by a resource 204 may be displayed. The mobile device 102 may communicate with a remote computer 501 that may execute one or more resources 405A-405N (generally referred to as remote resources 405) which may, in some embodiments, be remote applications 405. The remote computer 401 may execute a remoting client 410.

In some embodiments, resources 204 executing on the mobile device 102 may be applications configured to accept data inputted by a touch screen. For example, the resources 204 may be modified versions of applications that typically do not receive data from a touch screen. These modified applications 204 may receive data inputted by a user via a touch screen of the mobile device 102, and may be modified to accommodate typical touch screen input functions like a virtual keyboard and a virtual scroll menu. For example, a version of SAFARI, which is a web browser published by APPLE, may be modified to pan up when a user selects or gives focus to an edit control such as a text box. SAFARI may be modified to pan the application upwards to accommodate the virtual keyboard displayed over the browser and so that a user may view the text box whilst typing on the virtual keyboard.

In some embodiments, the mobile device 102 may communicate with a remote computer 401. The remote computer 401 may include a server, a client, or any other computing machine. In some embodiments the remote computer 401 may include a remote application server that executes one or more applications. The mobile device 102 may communicate with the remote computer 401 over a virtual channel. In some embodiments, the virtual channel may be established over a network and may be referred to as a control virtual channel. In some embodiments, the virtual channel may be a seamless virtual channel. A control virtual channel may be used to remote control commands and other miscellaneous commands while the seamless virtual channel may be used to remote application windows, a taskbar, a systray, etc. Thus, in some embodiments, one or more virtual channels may remote different functions and content. In some embodiments, the virtual channel may be established by a window management service 206 executing on the mobile device 102. In some embodiments, the virtual channel may be established by both the window management service 206 and a remoting client 410 executing on the remote computer 401. The virtual channel may, in some embodiments, facilitate communication sent using one or more protocols, such as the ICA protocol.

In some embodiments, the remote computer 401 may execute a remoting client 410. The remoting client 410 may be referred to as a control virtual channel or a seamless virtual channel and may be a remoting application that corresponds to the virtual channel used by the client 410 to transmit data to the mobile device 102 and receive data from the mobile device 102. In some embodiments, the remoting client 410 may collaborate with the window management service 206 to modify remote applications 405 for remote display on the mobile device 102. The window management service 206, may include CITRIX RECEIVER published by CITRIX SYSTEMS. In some embodiments, the remoting client 410 may communicate with the remote applications 405 to intercept event notifications and data that may be generated by the remote applications 405. In particular, the remoting client 410 may perform event-based detection of one or more controls using application programming interfaces provided by one or more of the remote applications 405. For example, in some embodiments at least one remote application 405 (e.g., 405B) may include an operating system executing on the remote computer 401. In some embodiments, the remoting client 410 may intercept events generated by controls within the remote application 405B using application program interfaces made available by the operating system 405B. The controls may be selected by the remoting client 410 based on whether the control has focus or is on a predetermined list of controls of interest. A control, in some embodiments, may include an object within an application that a user interacts with, e.g. a text box, drop down menu, radio button, button, check box, edit box, combo box, etc. The control may further be referred to as a field. In some embodiments, the remoting client 410 may intercept the control-generated events by registering with a communication interface associated with the application 405B to receive notifications when a focus-change event occurs within the application 405B. For example, the remoting client 410 may receive a notification when an object or control receives focus, e.g. a user selects a text box within the application.

The remoting client 410 may communicate with the window management service 206 over a virtual channel. In some embodiments, the remoting client 410 may send intercepted event notifications over the virtual channel to the window management service 206. In other embodiments, the remoting client 410 may transmit location coordinates for a control, the type of control, the contents of a control, the window handle of a control, and/or parent window information for a control. The window management service 206 may receive information from the remoting client 410 and adjust display of an application 204 on the native display 201 using the received information. Adjusting the display may include panning, zooming or otherwise modifying the display of the application 204.

In some embodiments, the remote computer 401 may execute one or more resources 405. These resources, in some embodiments, may include applications. In other embodiments, at least one resource may include an operating system executing on the remote computer 401. In those embodiments, the other applications 405 may execute within the context of the operating system. In some instances, the applications 405 may be referred to as remote applications 405.

Figure 5:
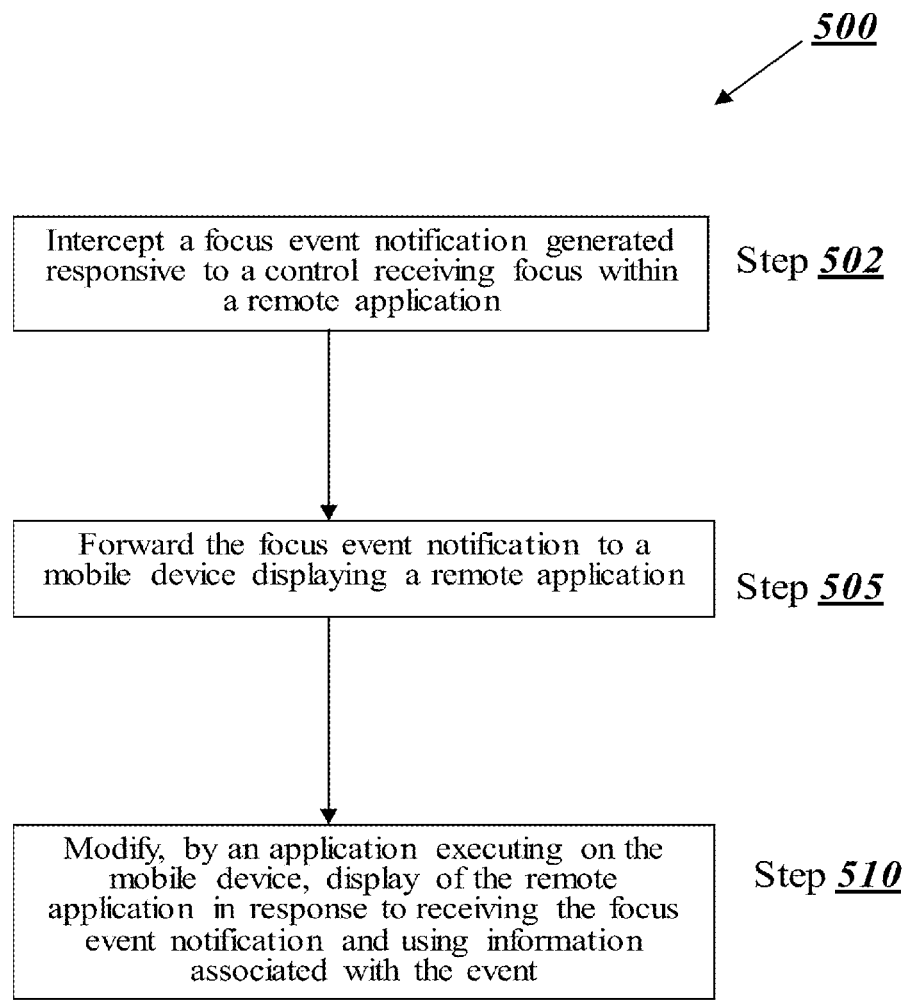
FIG. 5 illustrates a flow diagram depicting a method for altering the display of a remote application on a mobile device.

Illustrated in FIG. 5 is a method 500 in accordance with one or more aspects of this disclosure. The method of FIG. 5 may be used to alter a display of a remote application on a mobile device. An application executing on a remote computer may intercept a focus event notification generated in response to a control within a remote application receiving focus (step 502). The remote computer may forward the received or intercepted focus event notification to a mobile computing device (step 505). Upon receiving the focus event notification, an application executing on the mobile computing device may modify a display of the remote application in response to receiving the notification and according to information associated with the event (step 510).

According to one or more aspects of this disclosure, an application executing on a remote computer may intercept a focus event notification (step 502). The application may, in some embodiments, be a remoting client 410 executing on a remote computer 401. In some embodiments, the application may be any application executing on a remote computer 401 and able to hook into function calls issued by an application executing on the remote computer 401. The application executing on the remote computer 401, in some embodiments, may include a component inside WFSHELL.EXE (ICACTLS.DLL). In some embodiments, the application may be an application managing a control or seamless virtual channel established between the remote computer 401 and the mobile device 102. The focus event notification may, in some embodiments, include a call issued by a remote application executing on the remote computer 401 when a control or field within the remote application receives focus, e.g. a user selects or otherwise highlights the control or field. In some embodiments, the control may include any object or control, such as: an edit box, a textbox, a memo field, a combo box, a drop-down menu, a slider, a list box, or any other similar object or control. The function may, for example, include a function such as 'focus combo box" or any other function that generates a notification indicating a control received focus. In some embodiments, the application may use event-based detection facilitated by WINDOWS 7 UI AUTOMATION application program interfaces. In some embodiments, the application may use event-based detection facilitated by any API. In some embodiments, the application may register for notifications provided by these APIs using a COM interface associated with a particular control and/or a particular function.

In some embodiments, the application may forward the intercepted focus event notification to the mobile device 102 (step 505). The application may forward the notification upon intercepting or receiving the notification. In some embodiments, the application may send additional information to the mobile device 102 in response to receiving the notification. This additional information may include: the type of control that received focus (e.g. combo box, textbox); the name or an identifier of the control that received focus; the location or coordinates of the control within the application (e.g. where in the application output the control is located); the content of the control (e.g. values assigned to the control, strings associated with the control, etc.); a window handle of the control; a window identifier of the window displaying the control; the location or coordinates of the parent window displaying the control; or any additional information that may be used to determine the location of the control within the application output displayed by the mobile device 102.

An application executing on the mobile device 102 may modify the display of the remote application in response to receiving the focus event notification and information associated with the control (step 510). In some embodiments, this application may include a window management service 206 executing on the mobile device 102. In other embodiments, the application may include any application able to receive event and control information from a remote computer 401 and use it to modify output displayed on the native display 201. In response to receiving the focus event notification, the window management service 206 may modify the display of the remote application by panning the display upward to accommodate a virtual keyboard or virtual picker, may zoom to a section of the display, may display a zoom bubble, or may perform any combination of these actions. In some embodiments, the window management service 206 may modify the display of the remote application by auto-zooming.

In some embodiments, the method may further include determining whether a virtual keyboard or picker hides the control having focus before modifying the display of the remote application. In some embodiments, the window management service 206 may determine whether the virtual keyboard or picker hides the control, and upon determining that the control is hidden, the window management service 206 may pan or zoom the display of the application to permit the control to become visible. In some embodiments, a client executing on the mobile device 102, or the window management service 206, may cause the virtual keyboard or virtual picker to be displayed in response to input from a user. For example, a user may select or actuate a control displayed on the mobile device 102. This control, upon actuation, may cause a client on the mobile device 102 to display the virtual keyboard or virtual picker. Thus, display of the virtual keyboard or virtual picker might not be automatic and may require user input. In some embodiments, the client executing on the mobile device 102 may be modified so that when focus is given to an editable field displayed within a remote application window displayed on the mobile device 102, the client may automatically display a virtual keyboard or virtual picker. Similarly, when focus is removed from the editable field, the client may hide the virtual keyboard or virtual picker, optionally automatically.

In some embodiments, the method may include modifying the display of the application by including control values in the display of the application. For example, upon receiving the event notification and control information, the window management service 206 may determine whether the control is a type of control having associated values. Upon determining that the control has associated values, the window management service 206 may modify the display of the remote application to include the received values. For example, if one or more strings are associated with a combo box having received focus, the window management service 206 may modify the display to display a combo box that includes those strings. In other aspects, a client executing on the mobile device 102, or a window management service 206, may use local controls native to the mobile device 102 to display a remote control or to display graphics representative of a remote control. For example, when a remote Windows Combo Box is presented in an application, the client may display and/or use a local iPad picker control. Thus, the remote application displayed on the mobile device 102 may look like a native mobile device 102 application and may include at least some native functionality.

The method 500, in some embodiments, may include an additional step of transmitting actions on a control on the mobile device 102 back to the remote application. For example, Application A executing on the remote computer 401 may generate application output which may be displayed in an application output window on the remote computer 401. The application output generated by Application A may be transmitted to the mobile device 102 where it may be displayed within an application output window on the mobile device 102. The application output window on the mobile device 102 may be referred to as a local application window and may display remotely generated application output. In some embodiments, when an editable combo box field within the remotely generated application output receives focus, a client or a window management service 206 may intercept the on-focus event and may display or invoke a native, virtual picker control, e.g. the iPad picker control. Within the local application window and amongst the remotely generated application output, the native, virtual picker control may be displayed. A user may interact with the native control to generate input. Once the control is used to generate input, the client or window management service 206 may transmit the input to the remote computer 401. Upon receiving the input, the remote computer 401 may inject the control input into an actual control displayed within the actual application output generated by Application A. Injection of the received control input may be accomplished using a Windows UI Automation API.

Figure 6:
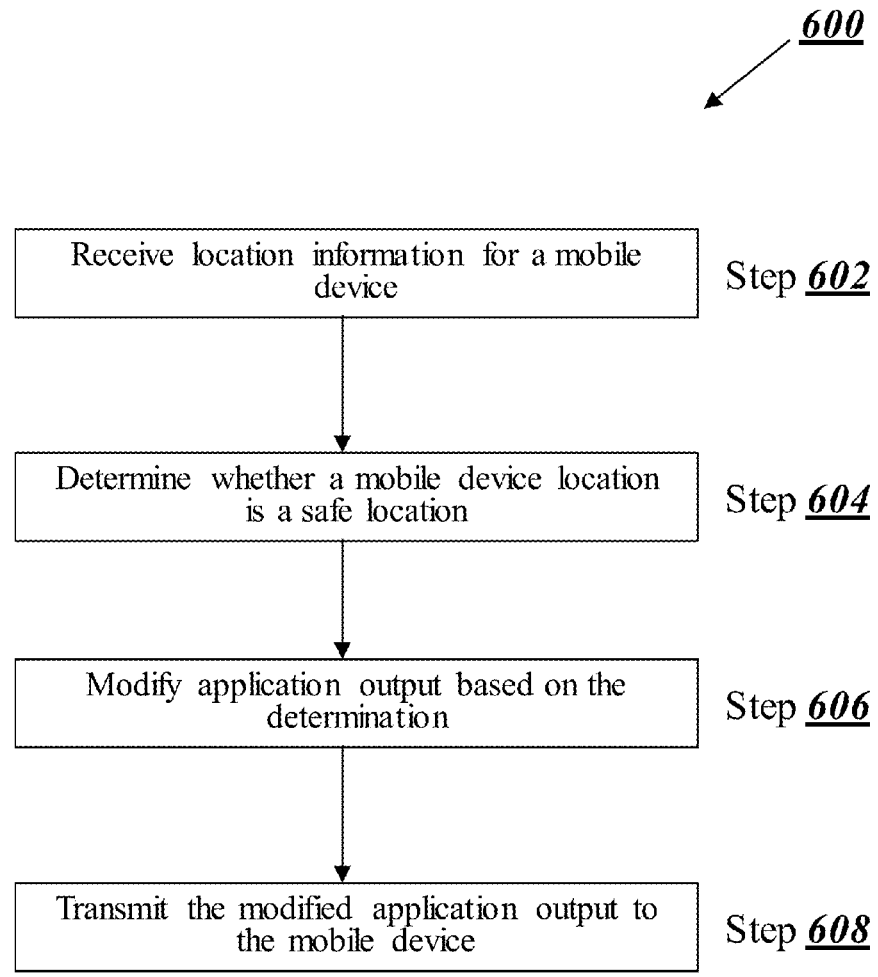
FIG. 6 illustrates a flow diagram depicting a method for mediating resources based on the physical location of a mobile device.

Illustrated in FIG. 6 is a method 600. Method 600 may be used to mediate resource and application access based on a physical location of a mobile device. In some embodiments, an application or service executing on a remote computer/server may receive location information for a mobile device (step 602). This location information may include GPS coordinates obtained by the mobile device and sent by the mobile device to the remote computer/server. In some embodiments, the mobile device may obtain the GPS coordinates using an application executing on the mobile device, and the application may communicate with GPS device(s) or component(s), which may receive communications from one or more satellites, to obtain the coordinate location of the mobile device at that point in time. Thus, the GPS coordinates may be time-based in the sense that they may be the coordinates for the mobile device at a particular point in time. Upon receiving the location information for the mobile device, one or more applications or services may determine whether the location of the mobile device is a 'safe' location (step 604). The one or more applications or services that may make the determination in connection with step 604 may be running on a remote computer or server in order to enhance security. The determination of step 604 may be made by comparing the location coordinates of the mobile device to a list of 'safe' coordinates. Step 604 may include determining whether the coordinates correspond to a region deemed 'safe.' A 'safe' location, in some embodiments, may be any location where, when a mobile device is located at that location, the mobile device may access sensitive and secure information and applications. When a determination is made that the mobile device is in a 'safe' location, one or more applications or services may modify output of an application (step 606) so that the mobile device is provided with access to secure and sensitive information. The one or more applications or services that may perform the modification of step 606 may be distinct from the one or more applications or services that may perform the determination of step 604. When a determination is made that the mobile device is not in a 'safe' location, the one or more services may modify output of an application (step 706) so that the mobile device is restricted from accessing secure and sensitive information. Upon modifying the output, the output may be transmitted to the mobile device (step 608) where it may be displayed to a user.

Figure 7:
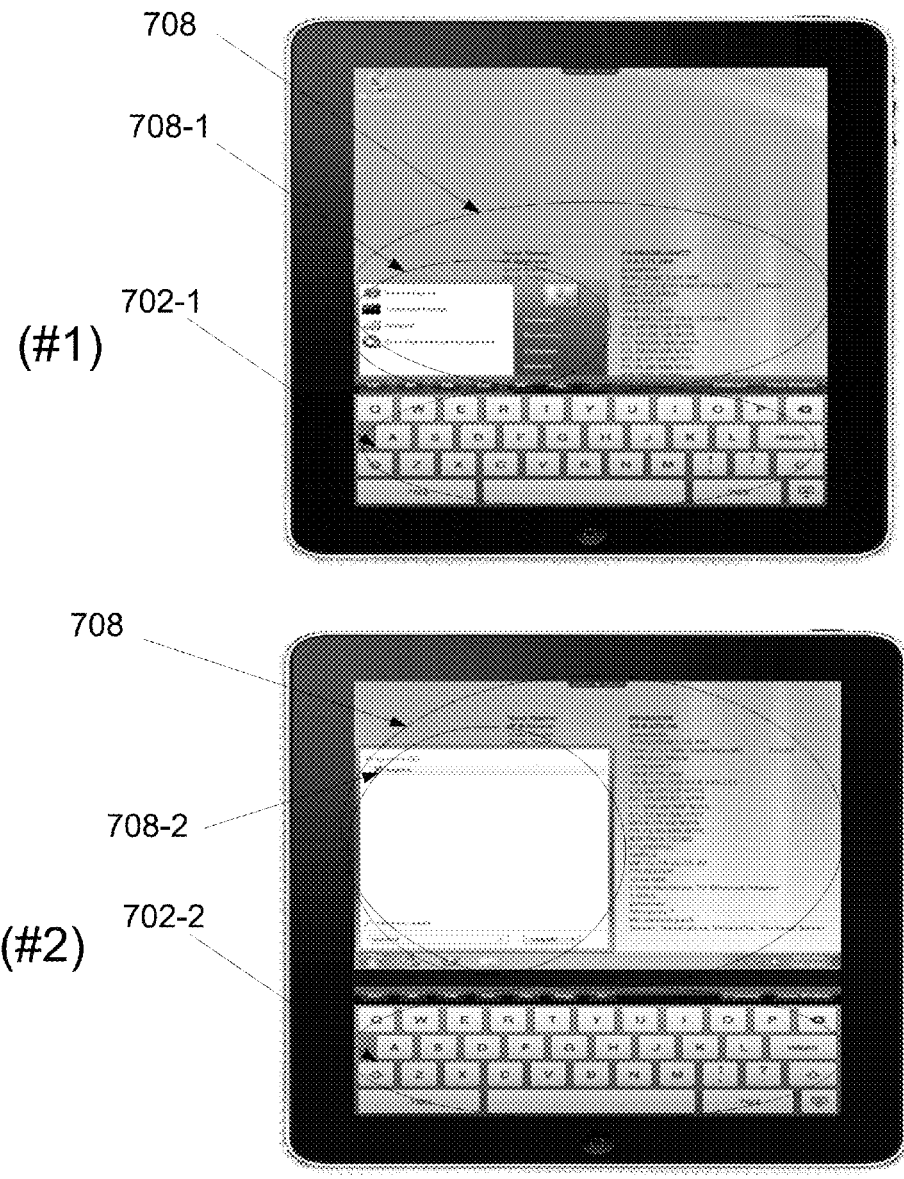
FIG. 7 illustrates an adjustment of a displayed image in accordance with one or more aspects of this disclosure.

Aspects of this disclosure may be directed to improving or enhancing a user's experience in connection with, e.g., one or more applications. FIG. 7 illustrates a before-and-after perspective of a display screen. In particular, in connection with the "before" screen shot on the top (#1) of FIG. 7, a user may have manually entered input that caused a virtual keyboard 702-1 to pop-up and be displayed on screen. Virtual keyboard 702-1 may hide or obscure one or more screen images 708, such as a section 708-1 that the user intended to edit with keyboard 702-1.

In contrast, and in connection with the "after" screen shot on the bottom (#2) of FIG. 7, screen images 708 may be panned in accordance with one or more aspects of this disclosure. For example, section 708-2 may be panned upwards, allowing the user continued visibility and access to the entirety of section 708-2. A virtual keyboard 702-2 (which may be similar to keyboard 702-1) may be displayed automatically when a portion of screen images 708 or section 708-2 receives focus. For example, a user selection of section 708-2, or an element or field included therein, may cause keyboard 702-2 to be displayed.

Figure 8:
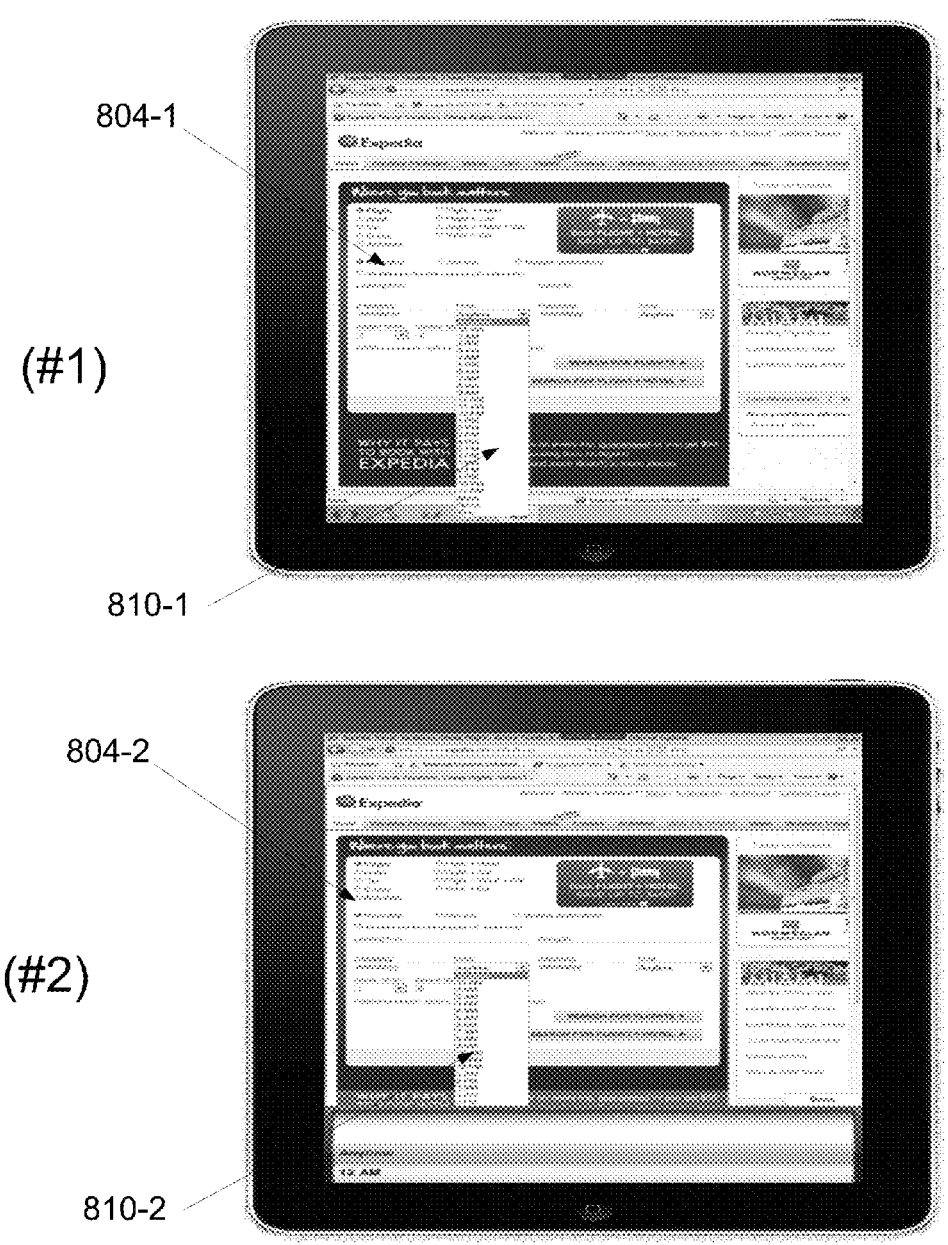
FIG. 8 illustrates an adjustment of a selection tool and display screen in accordance with one or more aspects of this disclosure.

FIG. 8 illustrates another "before-and-after" user experience or perspective, this time applied to a list of boxes that may be displayed inside of an internet browsing application (e.g., INTERNET EXPLORER), optionally running in a remote session. In the "before" screen shot (#1), a user may have to manually zoom in to pick an entry from a list 810-1 included in a window 804-1. In contrast, in the "after" screen shot (#2) that may have been generated using one or more aspects of this disclosure, a client or window management service may automatically display a native picker control that may be used to pick or select from items listed in a list 810-2 of a window 804-2. In some aspects, the picker control may be displayed responsive to determining that an editable field within an application received focus. Relative to window 804-1, window 804-2 may be a zoomed in version. The client or window management service may facilitate any number of operations, such as a zoom in or zoom out, to facilitate viewing, selection, or use. The operations may be initiated automatically in response to a list, or other portion of a display or window, receiving focus.

Aspects of this disclosure are directed to controlling, regulating, or mediating access to one or more resources. In some embodiments, a device, such as a client device, may determine or report location information. For example, a client device may determine its own location using GPS techniques. The client device may report its determined location, such as its GPS coordinates, to one or more devices, such as one or more servers. The one or more servers may control or mediate access to one or more resources depending on the location of the client device. The client device may include one or more mobile devices.

As described above, the client device may obtain GPS location information for itself. Upon obtaining its physical location, the client device may transfer the physical location information to one or more devices, such as a computer. This computer may include a remote computer and/or a remote server. The client device may connect to the computer to access resources and applications, such as an email client or email and/or other resources (e.g., documents, individual or aggregated data elements, applications, websites, etc). An application executing on the computer may compare the physical location of the client device with a list of safe locations, e.g. a predetermined coordinate listing or location listing. If the computer determines that the client device is in a "safe" location then the client device may be given access to one or more resources/applications, e.g. email.

Figure 9:
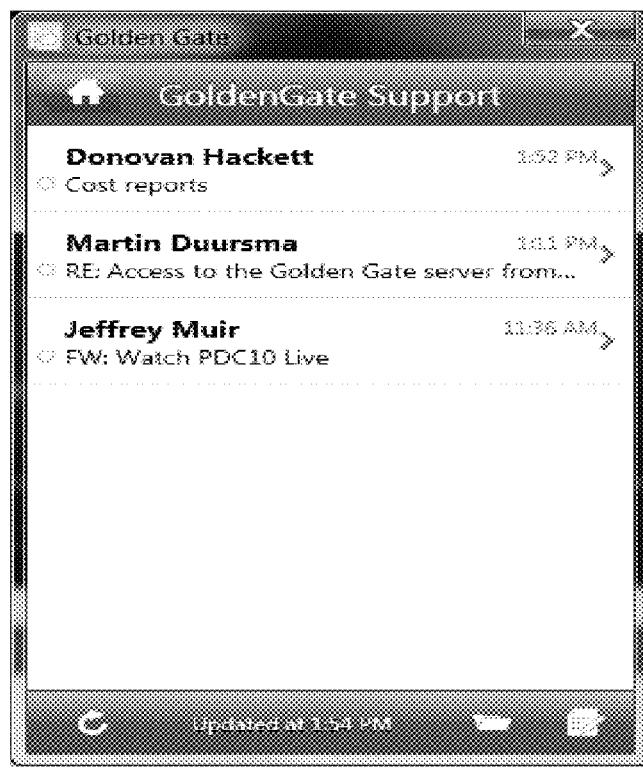
FIG. 9 illustrates access that may be provided to a resource in accordance with one or more aspects of this disclosure.

FIG. 9 illustrates a screen shot of a client device display screen. In FIG. 9, three emails in a user's email inbox are shown. All three resources/emails may be displayed normally, and a user may click on any of the emails to view the full state of the email. The top email may have been flagged as sensitive by the sender, Donovan Hackett, using an email application's privacy feature. For example, Donovan may have selected one or more privacy controls or features using a graphical user interface (GUI) associated with an email application when preparing the email with the subject "Cost reports" shown in FIG. 9.

In some embodiments, additional features may be used in connection with the email from Donovan Hackett to indicate that privacy features are associated with it. For example, a colored flag or a padlock icon may be displayed to indicate to the user of the client device that privacy controls have been selected by the sender in connection with the email. If the client device is in a "safe" location, then the flag may be a green color or the padlock may be represented in an "unlocked" state, thereby indicating to the user that the user has access (e.g., full access) to the email. Any number of indications could be used to convey privacy status information associated with an email or other resource. For example, when a user browsing or scrolling through her inbox of emails highlights a particular email with privacy controls associated with it, the client device may play an audio message that describes the privacy controls associated with the highlighted email.

Figure 10:
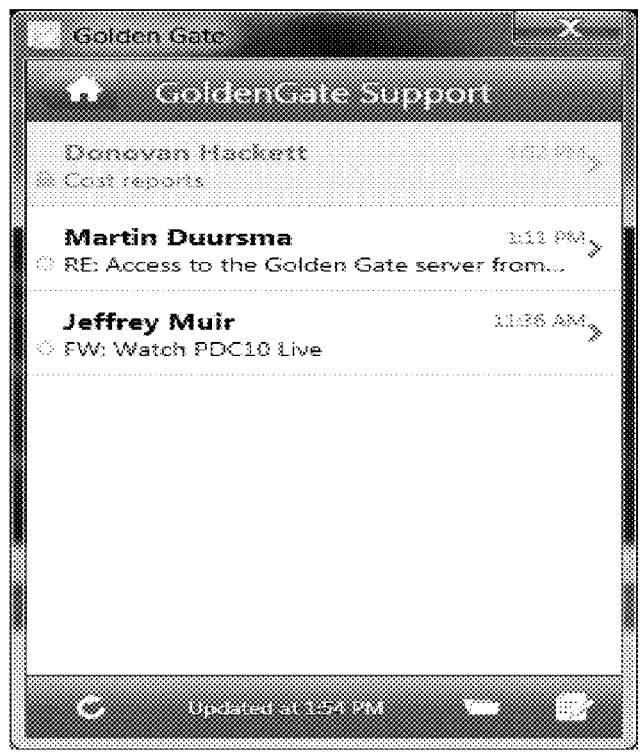
FIG. 10 illustrates a restriction that may be imposed on a resource in accordance with one or more aspects of this disclosure.
Figure 11:
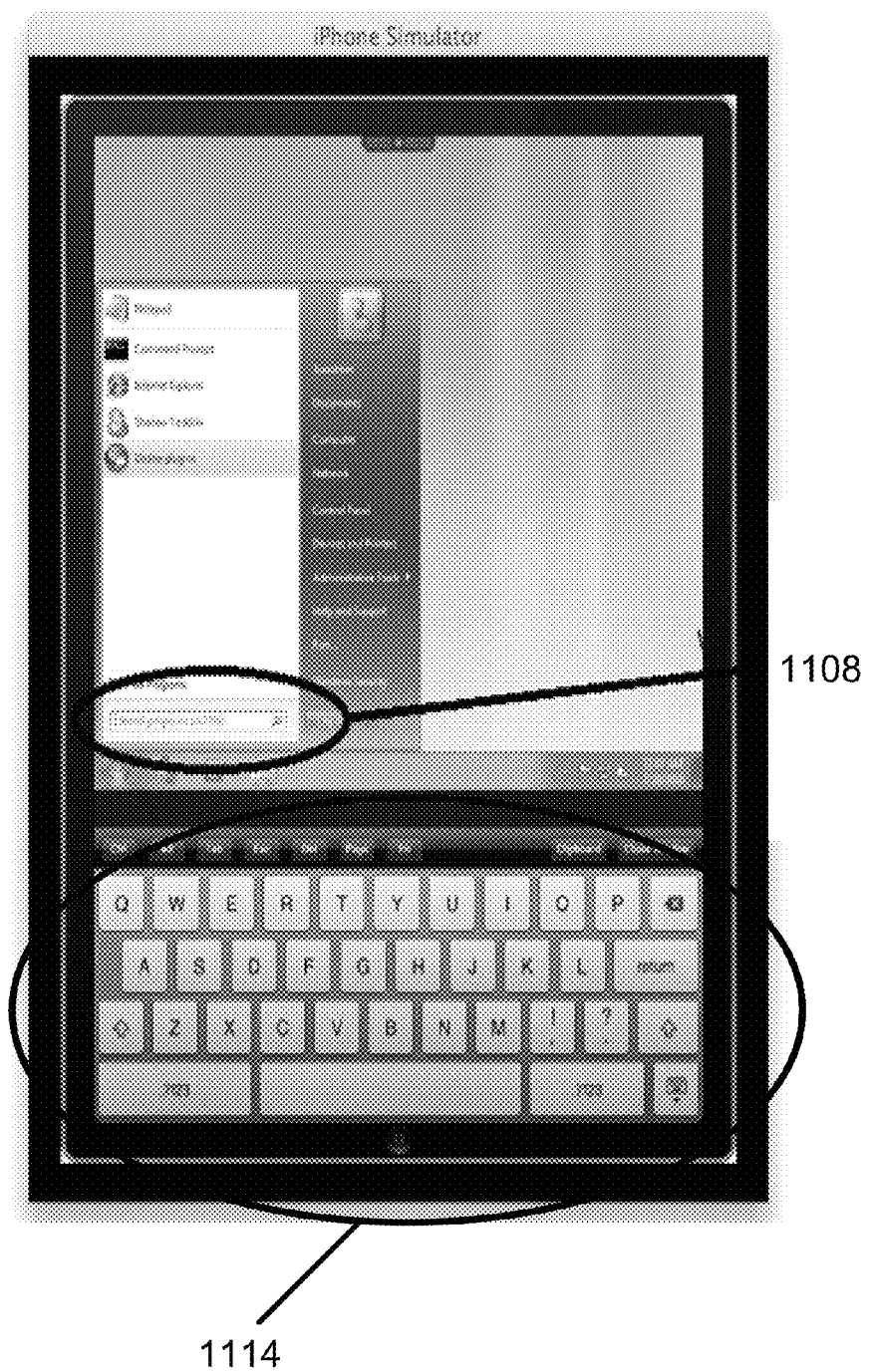
FIG. 11 illustrates an adjustment of a displayed image in accordance with one or more aspects of this disclosure.

Continuing the above example, if the user of the client device uses the client device in a location that is determined as not being a "safe" location, the user might not be able to access one or more emails flagged as sensitive. In some embodiments, the email may be disabled and if the user selects the email, it might not open. As shown in FIG. 10, the top email from Donovan Hackett that may be flagged as sensitive may shown as being grayed out or otherwise shaded, and a small padlock icon may be displayed (in a "locked" state) on the email to indicate its unavailability. This may be done in response to the client device being located in an unsafe location. In some embodiments, an inaccessible or unavailable email might not even appear in the display screen if the client device is not in a "safe" location. Such features may be useful to preclude an unauthorized user from learning of the existence of the email, the subject of the email, the sender of the email, or any other details associated with the email.

In some embodiments, a client device that might be unable to determine or report location information (e.g., GPS location information) may be treated as if it is always in an unsafe location. Providing for such treatment may help to ensure that security associated with an email is not compromised. In some embodiments, an e-mail application may be configured to permit senders to specify locations in which the recipient may or may not view the e-mail.

In some embodiments, a location could be defined as a geographical region whose boundary is defined by a sequence of GPS coordinates. This geographical region description may further include some specification for a line between adjacent points in a sequence of GPS coordinates.

In some embodiments, a set or group of predetermined and/or predefined regions of potential interest (e.g. legal jurisdictions such as a country, continent, city, county or state) may be included or specified. These regions may be designated as safe or unsafe. In some embodiments, one or more administrators or personnel, may restrict access on the basis of unsafe locations rather than determine whether a location is safe. In some embodiments, a group of users may provide feedback as to whether a particular location is safe or unsafe.

A network or service provider or operator may determine whether a particular location is safe or unsafe based at least in part on the feedback.

In some embodiments, location information (e.g., GPS location information) may serve as an input to a policy. A policy engine may make one or more decisions, based at least in part on the policy, to control a type or level of access to a resource (e.g., an application). In some embodiments, authentication to a network (e.g., a corporate network) or to one or more servers, databases, or repositories, may depend on a client device's location. For example, successful authentication through an access gateway or to servers on the network might be dependent on the location information provided by the client device.

In some embodiments, one or more restrictions may be imposed on data or content, such as an electronic document, based on a client device's location. For example, one or more policies (such as SmartAccess policies) may use location information to decide whether to and how to grant access to various resources. Content owners or providers who generally provide public access may restrict a portion of the access based on an actual geographic location defined by location coordinates (e.g., GPS coordinates) rather than an IP address. A content owner/provider may want to restrict content for any number of reasons. For example, it may be desirable to restrict content to a specific purpose or event, e.g. allowing consumption at a specifically located event such as a corporate meeting or a court case. In some embodiments, a determination may be made that a client device is within a threshold distance of an event, and access to a resource may be based on the determination. Enforcing a policy of non-consumption of event coverage within a region "local" to the event may help to ensure that in-person or live attendance remains high. For example, a football team may enforce a non-consumption policy in proximity to the team's stadium in order to help promote ticket sales. As another example, excluding access to a broadcast or other details of an event within a threshold distance of the event may comprise predetermining that a region within the threshold distance of the event is an unsafe area. One or more policies or restrictions may help to control content that should not be consumed offsite (e.g., sensitive SmartAuditor recordings or financial documents).

In some embodiments, vendors, administrators, other personnel, or users may want to restrict the availability of certain resources (e.g., applications) to users within certain legal jurisdictions, perhaps because they are/are not compliant with regulations in force within those regions (e.g., European data privacy laws or crypto export restrictions), or with license conditions. A filtering of application publication or transmittal of application output data based on the client device location may be used to restrict access to a resource. Thus, resources might not be launched or opened when access is restricted. For use cases such as smooth roaming, session reconnection, or session sharing, a new location may provide the impetus to hide or to close applications that are running when a reconnection occurs and a determination is made that the new location does not have the same permissions as the previous location.

In some embodiments, policy decisions may serve as an input to, or help drive, a business model. For example, an application licensing agreement or a consumption-based service charge agreement may be established or modified based on one or more policy decisions. An end user in a first location may cause the consumption of a license from a first pool, while an end user in a second location may cause the consumption of a license from a second pool. Similarly two users in two different locations may be charged different usage-based charges for using the same or a similar service. Such features may enable vendors to provide various price offers for different markets.

In some embodiments, a determination may be made whether to record a resource, such as a session or an application in a session. Terms and conditions associated with the recording may also be determined. For example, a recording application, such as SmartAuditor, may automatically decide whether to record a resource presented on a particular channel. In some embodiments, a determination may be made whether to record specific applications or whether to record specific channels of information. Such decisions may be used to influence how recordings are treated. For example, a length of a recording or a retention period for the recording may be determined. Decisions may be motivated by considerations of the kinds of location-based risk and compliance concerns held by an enterprise, or by legal considerations. For example, certain jurisdictions might not allow recordings under any or certain circumstances, or may constrain the types of information that may be recorded.

While certain exemplary embodiments have been described and shown in the accompanying drawings, it is to be understood that such embodiments are merely illustrative of and not restrictive on the aspects described herein. Additionally, it is possible to implement the embodiments described herein or some of its features in hardware, programmable devices, firmware, software or a combination thereof. Aspects of the disclosure may be embodied in a processor-readable storage medium or machine-readable medium such as a magnetic (e.g., hard drive, floppy drive), optical (e.g., compact disk, digital versatile disk, etc), or semiconductor storage medium (volatile and non-volatile).

Aspects of this disclosure may readily be applied to, and adapted to be operative on, one or more communication systems. Those communication systems may include computer networks, television networks, satellite networks, telephone and cellular networks, and the like.

Although not required, various aspects described herein may be embodied as a method, a data processing system, and/or as a transitory and/or non-transitory computer-readable medium storing executable instructions. Accordingly, those aspects may take the form of an entirely hardware embodiment, an entirely software embodiment, an entirely firmware embodiment, or an embodiment combining software, firmware and hardware aspects. The functionality may be resident in a single computing device, or may be distributed across multiple computing devices/platforms, the multiple computing devices/platforms optionally being connected to one another via one or more networks. Moreover, the structural components described herein may be distributed amongst one or more devices, optionally within a common housing or casing.

Various signals representing content, data, information, or events as described herein may be transferred between a source and a destination in the form of electromagnetic waves traveling through signal-conducting media such as metal wires, optical fibers, and/or wireless transmission media (e.g., air and/or space).

The various methods and acts may be operative across one or more computing servers, databases, and one or more networks. The functionality may be distributed in any manner, or may be located in a single computing device (e.g., a server, a database, a client computer, etc.). As discussed herein, a resource (e.g., an application, data or a content item, etc.) may be distributed to intermediary/network components and client-side devices at various times and in various formats. The distribution and transmission techniques described herein may leverage existing components and infrastructure to minimize power dissipation, operational complexity, footprint size, user and management involvement, amongst other factors and costs.

The methodological acts and processes described herein may be tied to particular machines or apparatuses. For example, one or more portions of a display screen may be adjusted by a computer (e.g., a server) and/or a client device (e.g., a mobile device) to accommodate a virtual keyboard or other data entry tool when a displayed control receives focus. As another example, access to one or more resources at a client device may be controlled by a computer. More generally, one or more apparatuses may include one or more processors and memory storing instructions that, when executed, cause the one or more apparatuses to perform the methodological acts and processes described herein. Furthermore, the methodological acts and processes described herein may perform a variety of functions including transforming an article (e.g., (1) a portion of a display screen optionally including a control element, (2) a resource subject to privacy or access controls, etc.) into a different state or thing (e.g., (1) an adjusted portion of a display screen accommodating a virtual keyboard or other data entry tool, (2) a controlled resource, etc.).

Aspects of the disclosure have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the figures may be performed in other than the recited order, and that one or more steps illustrated may be optional in accordance with aspects of the disclosure.

What is claimed is:

1. A method comprising:
executing, by a first computing device, an application on behalf of a second computing device;
receiving information indicating a location of the second computing device;
determining that the location of the second computing device is a safe location by at least comparing the location of the second computing device to at least one of one or more authorized locations in which access to one or more e-mails is authorized, wherein the one or more e-mails includes an indication of the one or more authorized locations; and
responsive to determining that the location of the second computing device is a safe location, providing, by the first computing device, the second computing device with access to the one or more e-mails in connection with execution of the application and transmitting application output data indicative of the one or more e-mails to the second computing device.

2. The method of claim 1, wherein the application output data indicative of the one or more e-mails includes draw commands and images generated by the application.

3. The method of claim 1, further comprising:
providing, by the first computing device, access to one or more remote files subject to the second computing device being within one or more additional authorized locations in which access to the one or more remote files is authorized.

4. The method of claim 1, further comprising:
receiving, at the first computing device, information indicating a second location of the second computing device;
determining that the second location of the second computing device is an unsafe location; and
responsive to determining that the second location of the second computing device is an unsafe location, restricting access to the one or more e-mails.

5. The method of claim 4, further comprising:
transmitting graphical or audio data to the second computing device indicating that access to the one or more e-mails is restricted.

6. The method of claim 4, further comprising:
causing one or more indications of the one or more e-mails to be removed from a display screen associated with the second computing device responsive to restricting access to the one or more e-mails.

7. The method of claim 1, wherein the information indicating the location of the second computing device includes GPS location information of the second computing device.

8. The method of claim 1, wherein determining that the location of the second computing device is a safe location includes determining that the location of the second computing device is within a threshold distance of the at least one of the one or more authorized locations.

9. The method of claim 1, wherein the indication of the at least one of the one or more authorized locations includes an indication of at least one location in which a recipient of the one or more e-mails is authorized to access the one or more e-mails.

10. An apparatus, comprising:
a processor; and
memory storing executable instructions that, when executed by the processor, cause the apparatus to:
execute an application on behalf of a computing device,
receive information indicating a location of the computing device,
determine that the location of the computing device is a safe location by at least comparing the location of the computing device to at least one of one or more authorized locations in which access to one or more e-mails is authorized, wherein the one or more e-mails includes an indication of the one or more authorized locations, and
responsive to determining that the location of the computing device is a safe location, provide the computing device with access to the one or more e-mails in connection with execution of the application and transmit application output data indicative of the one or more e-mails to the computing device.

11. The apparatus of claim 10, wherein the application output data indicative of the one or more e-mails includes draw commands and images generated by the application.

12. The apparatus of claim 10, wherein the executable instructions, when executed by the processor, cause the apparatus to:
provide access to one or more remote files subject to the computing device being within one or more additional authorized locations in which access to the one or more remote files is authorized.

13. The apparatus of claim 10, wherein the executable instructions, when executed by the processor, cause the apparatus to:
receive information indicating a second location of the computing device,
determine that the second location of the computing device is an unsafe location, and
responsive to determining that the second location of the computing device is an unsafe location, restrict access to the one or more e-mails.

14. The apparatus of claim 13, wherein the executable instructions, when executed by the processor, cause the apparatus to:
  transmit graphical or audio data to the computing device indicating that access to the one or more e-mails is restricted.

15. The apparatus of claim 13, wherein the executable instructions, when executed by the processor, cause the apparatus to:
  cause one or more indications of the one or more e-mails to be removed from a display screen associated with the computing device responsive to restricting access to the one or more e-mails.

16. The apparatus of claim 10, wherein the information indicating the location of the computing device includes GPS location information of the computing device.

17. The apparatus of claim 10, wherein determining that the location of the computing device is a safe location includes determining that the location of the computing device is within a threshold distance of the at least one of the one or more authorized locations.

18. A method comprising:
  executing, by a first computing device, a first application on behalf of a second computing device;
  executing, by the first computing device, a second application on behalf of a third computing device;
  receiving information indicating a location of the second computing device;
  determining that the location of the second computing device is a safe location at least by comparing the location of the second computing device to at least one of one or more authorized locations in which access to a first set of e-mails is authorized, wherein the first set of e-mails includes an indication of the one or more authorized locations;
  responsive to determining that the location of the second computing device is a safe location, providing, based at least in part on a consumption of a first license, the second computing device with access to the first set of e-mails in connection with the first application and transmitting application output data indicative of the first set of e-mails to the second computing device;
  receiving information indicating a location of third computing device;
  determining that the location of the third computing device is a safe location; and
  responsive to determining that the location of the third computing device is a safe location, providing, based at least in part on a consumption of a second license, the third computing device with access to a second set of e-mails in connection with execution of the second application and transmitting application output data indicative of the second set of e-mails to the third computing device,
  wherein the first license is associated with a first usage-based charge different from a second usage-based charge associated with the second license.

* * * * *